United States Patent
Shin et al.

(10) Patent No.: US 11,005,723 B2
(45) Date of Patent: May 11, 2021

(54) METHOD OF MODELING CHANNEL AND TRANSMITTING MOLECULES FOR MOLECULAR COMMUNICATION

(71) Applicant: University-Industry Cooperation Group of Kyung-Hee University, Yongin-si (KR)

(72) Inventors: Hyundong Shin, Suwon-si (KR); Youngmin Jeong, Seongnam-si (KR); Dung Phuong Trinh, Seongnam-si (KR)

(73) Assignee: University-Industry Cooperation Group of Kyung-Hee University, Yongin-si (KR)

( * ) Notice: Subject to any disclaimer, the term of this patent is extended or adjusted under 35 U.S.C. 154(b) by 752 days.

(21) Appl. No.: 15/901,018

(22) Filed: Feb. 21, 2018

(65) Prior Publication Data
US 2019/0075030 A1    Mar. 7, 2019

(30) Foreign Application Priority Data
Sep. 6, 2017   (KR) .................. 10-2017-0113989

(51) Int. Cl.
| | | |
|---|---|---|
| *G01N 31/00* | (2006.01) | |
| *H04L 12/24* | (2006.01) | |
| *H04L 27/04* | (2006.01) | |
| *H04B 13/00* | (2006.01) | |
| *H04L 27/06* | (2006.01) | |
| *B82Y 30/00* | (2011.01) | |
| *B82Y 10/00* | (2011.01) | |

(52) U.S. Cl.
CPC ............ *H04L 41/145* (2013.01); *B82Y 30/00* (2013.01); *H04B 13/00* (2013.01); *H04L 27/04* (2013.01); *H04L 27/06* (2013.01); *B82Y 10/00* (2013.01)

(58) Field of Classification Search
CPC ....... H04L 41/145; H04L 27/04; H04L 27/06; B82Y 30/00; B82Y 10/00; H04B 13/00
USPC ......................................................... 702/32
See application file for complete search history.

(56) References Cited

U.S. PATENT DOCUMENTS 9,621,283 B1 * 4/2017 Shin .................... H04B 10/90
2017/0346572 A1 * 11/2017 Shin .................... H04B 13/005

* cited by examiner

*Primary Examiner* — Don N Vo
(74) *Attorney, Agent, or Firm* — Studebaker & Brackett PC

(57) ABSTRACT

Provided are a method of modeling a channel and transmitting molecules for passive transport molecular communication, the method being performed by a first device, that is, a transmission device, and including a molecular transmission step of transmitting molecules which are an information carrier through the channel, an H-diffusion function information reception step of receiving information about an H-diffusion function which is a function associated with a diffusion of the channel, and a molecular transmission property control step of controlling a transmission property that the molecules are transmitted based on the received information about the H-diffusion function, a method of modeling a molecular channel using an H-diffusion function in relation to the diffusion of the channel, and a transmission control method thereof.

22 Claims, 16 Drawing Sheets

(a) $K = 10^{-10}$ [m²/s]

(b) $K = 1$ [m²/s]

(a) $a = 10^{-5}$ [m]

(b) $a = 10^{-8}$ [m]

(c) $a = 10^{-10}$ [m]

METHOD OF MODELING CHANNEL AND TRANSMITTING MOLECULES FOR MOLECULAR COMMUNICATION

CROSS REFERENCE TO RELATED APPLICATION

The present application claims the benefit of Korean Patent Application No. 10-2017-0113989 filed in the Korean Intellectual Property Office on Sep. 6, 2017, the entire contents of which are incorporated herein by reference.

BACKGROUND OF THE INVENTION

1. Technical Field

The present invention relates to a method of modeling a channel and transmitting molecules for molecular communication and a nanomachine performing the same and, more particularly, to a method of modeling a channel and transmitting molecules for molecular communication and a nanomachine performing the same.

2. Description of the Related Art

A nanotechnology has been in the spotlight in various applications, such as a medical system, a healthcare system, a nanosubstance, a nanomachine, and a nanoscale communication network. In particular, molecular communication is a scheme for communication between nanomachines. In molecular communication, information is transported through molecules. In passive transport molecular communication, random diffusion of molecules within a fluid medium may be exclusively determined by a diffusion rule.

However, in relation to such molecular diffusion, there is a problem in that a systematic method regarding channel modeling and regarding how to control molecular transmission based on such a modeled channel is not present. Accordingly, there is a problem in that molecular transmission cannot be dynamically controlled in response to a change in the state of a fluid medium.

SUMMARY OF THE INVENTION

Accordingly, an object of the present invention is to provide a method of modeling a molecular channel, which is related to the diffusion of a channel, and a transmission control method thereof.

Furthermore, another object of the present invention is to provide a method of controlling the property that molecules are transmitted by taking into consideration the transport property of molecules through a channel on the time-space.

According to an embodiment of the present invention, there may be provided a method of modeling a channel and transmitting molecules for passive transport molecular communication, the method being performed by a first device, that is, a transmission device, and including a molecular transmission step of transmitting molecules which are an information carrier through the channel, an H-diffusion function information reception step of receiving information about an H-diffusion function which is a function associated with a diffusion of the channel, and a molecular transmission property control step of controlling a transmission property that the molecules are transmitted based on the received information about the H-diffusion function, a method of modeling a molecular channel using an H-diffusion function in relation to the diffusion of the channel, and a transmission control method thereof.

In one embodiment, in the H-diffusion function information reception step, the function is a green function of H-diffusion and may be determined by Equation 14.

In one embodiment, in the H-diffusion function information reception step, the received information may include information about the trajectory of N molecules on the time-space of the channel.

In one embodiment, the H-diffusion function information reception step may include receiving information about a diffusion factor $\upsilon$ based on a mean square displacement $<|x|^2>$ according to the time of the molecules.

In one embodiment, the H-diffusion function information reception step may include receiving first information about a molecular diffusion parameter $\alpha$ obtained from information about a probability density function (PDF) of z, that is, H-variates associated with H-diffusion of the molecules, and second information about a Q-Q plot indicative of quantiles according to the molecular diffusion parameter $\alpha$ based on quantiles for a reference diffusion parameter $\alpha_1$.

In one embodiment, the molecular transmission property control step may include determining an energy amplitude level and modulation order (M-ary) of the molecules based on the first information and controlling transmission speed of information, a transport stream number N, and M-ary associated with the molecules based on the information about the trajectory of the molecules or the information about the diffusion factor $\upsilon$. The transport stream number N may be a total number of available reception means of receive nanomachines or less.

In another aspect of the present invention, a method of modeling a channel and receiving molecules for passive transport molecular communication is performed by a second device of a reception device, and includes a molecular reception step of receiving molecules, that is, an information carrier, through the channel, an H-diffusion function information transmission step of transmitting information about an H-diffusion function, that is, a function associated with the diffusion of the channel, and a molecular information reception/decoding step of receiving molecular information whose transmission property that the molecules are transmitted is controlled based on the received information about the H-diffusion function and of decoding the received molecular information.

In one embodiment, in the H-diffusion function information transmission step, the function is a green function of H-diffusion and may be determined by Equation 14.

In one embodiment, in the H-diffusion function information transmission step, the transmitted information may include information about the trajectory of N molecules on the time-space of the channel.

In one embodiment, the H-diffusion function information transmission step may include estimating a mean square displacement $<|x|^2>$ according to the time of the molecules and transmitting information about a diffusion factor $\upsilon$ based on the estimated mean square displacement $<|x|^2>$.

In one embodiment, the H-diffusion function information transmission step may include transmitting first information about a molecular diffusion parameter $\alpha$ obtained from information about the probability density function (PDF) of z which is H-variates associated with H-diffusion of the molecules and second information about a Q-Q plot indicative of quantiles according to the molecular diffusion parameter $\alpha$ based on quantiles for a reference diffusion parameter $\alpha_1$.

In one embodiment, the molecular information reception/decoding step may include receiving the information carrier transmitted by a first device based on an energy amplitude level of the molecules determined by the first device based on the first information and transmission speed of information determined by the first device and associated with the molecules based on the second information, and decoding the received information carrier. The transmission speed may be determined based on the information about the trajectory of the molecules or the information about the diffusion factor $\upsilon$. The speed at which the information carrier is decoded may be determined based on the diffusion factor $\upsilon$ and a method of modulating the information carrier.

In yet another aspect of the present invention, a transmit nanomachine performing molecular transmission according to channel modeling for passive transport molecular communication includes a transceiver configured to transmit molecules which are an information carrier through the channel and to receive information about an H-diffusion function which is a function associated with a diffusion of the channel and a controller configured to control a transmission property that the molecules are transmitted based on the received information about the H-diffusion function.

In one embodiment, the information received by the transceiver may include information about the trajectory of N molecules on the time-space of the channel.

In one embodiment, the information received by the transceiver may include information about a diffusion factor $\upsilon$ based on a mean square displacement $<|x|^2>$ according to the time of the molecules.

In one embodiment, the information received by the transceiver may include first information about a molecular diffusion parameter $\alpha$ obtained from information about the probability density function (PDF) of z which is H-variates associated with H-diffusion of the molecules and second information about a Q-Q plot indicative of quantiles according to the molecular diffusion parameter $\alpha$ based on quantiles for a reference diffusion parameter $\alpha_1$.

In one embodiment, the controller may be configured to determine an energy amplitude level and modulation order (M-ary) of the molecules based on the first information and to control transmission speed of information, a transport stream number N, and M-ary associated with the molecules based on the information about the trajectory of the molecules or the information about the diffusion factor $\upsilon$. The transport stream number N may be a total number of available reception means of receive nanomachines or less.

In yet another aspect of the present invention, a receive nanomachine performing molecular reception according to channel modeling for passive transport molecular communication includes a transceiver configured to receive molecules which are an information carrier through the channel and to transmit information about an H-diffusion function which is a function associated with a diffusion of the channel and a controller configured to receive molecular information whose transmission property that the molecules are transmitted is controlled based on the received information about the H-diffusion function and of decoding the received molecular information.

In one embodiment, the information transmitted by the transceiver may include information about the trajectory of N molecules on the time-space of the channel.

In one embodiment, the controller may be configured to estimate a mean square displacement $<|x|^2>$ according to the time of the molecules and to transmit information about a diffusion factor $\upsilon$ based on the estimated mean square displacement $<|x|^2>$.

In one embodiment, the transceiver may be configured to transmit first information about a molecular diffusion parameter $\alpha$ obtained from information about the probability density function (PDF) of z which is H-variates associated with H-diffusion of the molecules and second information about a Q-Q plot indicative of quantiles according to the molecular diffusion parameter $\alpha$ based on quantiles for a reference diffusion parameter $\alpha_1$.

In one embodiment, the controller may be configured to receive the information carrier transmitted by a first device based on an energy amplitude level of the molecules determined by the first device based on the first information and transmission speed of information determined by the first device and associated with the molecules based on the second information and to decode the received information carrier. The transmission speed may be determined based on the information about the trajectory of the molecules or the information about the diffusion factor $\upsilon$. The speed at which the information carrier is decoded may be determined based on the diffusion factor $\upsilon$ and a method of modulating the information carrier.

DETAILED DESCRIPTION

Figure 1:
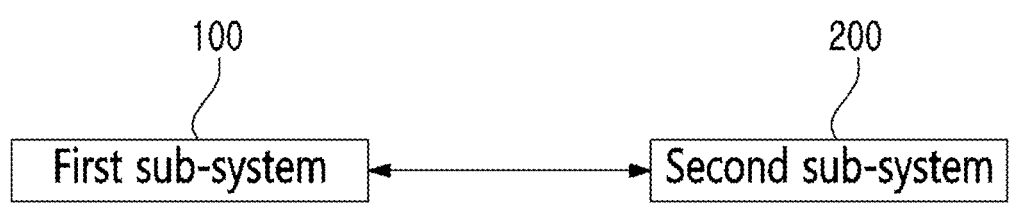
FIG. 1 shows a molecular system performing a method of predicting a molecular channel according to an embodiment of the present invention.

The above characteristics and effects of the present invention will become more evident from the following detailed description related to the accompanying drawings. Accordingly, a person having ordinary knowledge in the art to which the present invention pertains may readily practice the technical spirit of the present invention. The present invention may be changed in various ways and may have several embodiments. Specific embodiments are illustrated in the drawings and are described in detail. It is however to be understood that the present invention is not intended to be limited to specific disclosure forms and the present invention includes all changes, equivalents and substitutions which fall within the spirit and technological scope of the present invention. Terms used in this specification are merely used to describe specific embodiments and are not intended to limit the present invention.

Similar reference numerals are used for similar elements while each drawing is described.

Terms, such as the first and the second, may be used to describe various elements, but the elements should not be restricted by the terms. The terms are used to only distinguish one element from the other element.

For example, a first element may be named a second element without departing from the range of right of the present invention. Likewise, a second element may be named a first element. The term "and/or" includes a combination of a plurality of related and illustrated items or any one of a plurality of related and described items.

Unless defined otherwise, all terms used herein, including technological terms or scientific terms, have the same meanings as those generally understood by persons of ordinary skill in the technological field to which the present invention pertains.

The terms, such as terms that are generally used and defined in dictionaries, should be construed as having meanings identical to those that are used in the context of related technology, and should not be construed as having ideal or excessively formal meanings unless explicitly defined otherwise.

It is to be noted that the suffixes of elements used in the following description, such as a "module", a "block" and a "unit", are assigned or interchangeable with each other by taking into consideration only the ease of writing this specification, but in themselves are not particularly given distinct meanings and roles.

Hereinafter, embodiments of the present invention are described in detail so that a person having ordinary knowledge in the art may easily practice the embodiments with reference to the accompanying drawings. In describing the embodiments of the present invention, a detailed description of a related function or construction will be omitted if it is deemed that such description would make the gist of the present invention unnecessarily vague.

Hereinafter, a method of predicting a molecular channel and a system for predicting a molecular channel according to an embodiment of the present invention are described below.

FIG. 1 shows a molecular system performing a method of predicting a molecular channel according to an embodiment of the present invention. As shown in FIG. 1, the molecular system includes a plurality of subsystem, and may be expressed as including a first subsystem 100 and a second subsystem 200, for convenience sake. However, the present invention is not limited to the first and the second subsystems 100 and 200 only and may be applied between a specific number of subsystems. The first and the second subsystems 100 and 200 may be specific nanomachines. That is, the first and the second subsystems 100 and 200 may be a first (molecular) device, that is, a transmission device, and a second (molecular) device, that is, a reception device, respectively. Any one of the first (molecular) device 100 and the second (molecular) device 200 is a transmission device, and the other device thereof may be a reception device. The first (molecular) device 100 also includes a control machine that controls a plurality of the second (molecular) devices 200.

Figure 2:
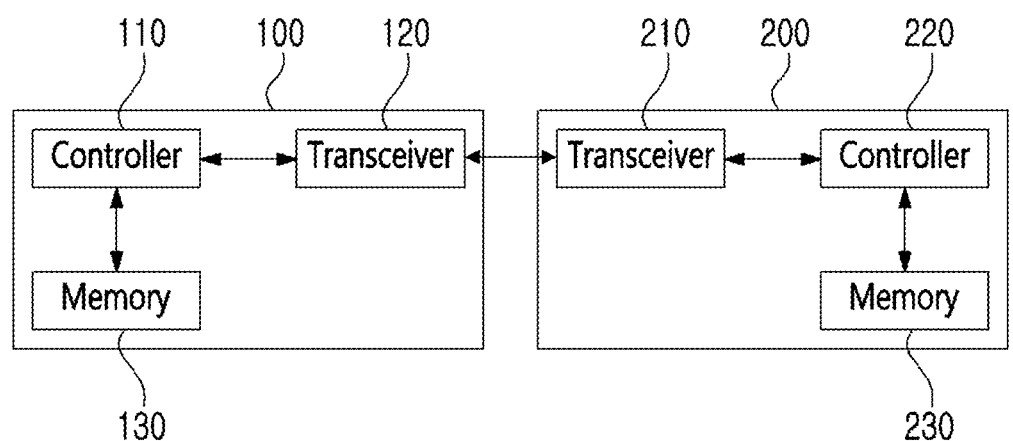
FIG. 2 shows a detailed configuration of a nanomachine according to an embodiment of the present invention.

FIG. 2 shows a detailed configuration of a nanomachine according to an embodiment of the present invention. For convenience sake, a transmission device (or also referred to as a "transmit nanomachine") may be called the first device 100, and a reception device (or also referred to as a "receive nanomachine") may be called the second device 200. However, the present invention is not limited thereto, and vice versa as described above. Furthermore, the nanomachine may also operate as a transceiver device.

The first device 100 includes a (nano)controller 110, a (nano)transceiver 120 and (nano)memory 130. Likewise, the second device 200 includes a (nano)controller 210, a (nano) transceiver 220 and (nano)memory 230. In this case, the transceiver 120, 220 may be called a molecular transceiver because it transmits and receives molecular data through a molecular channel. Furthermore, the transceiver 120, 220 may be called a classical transceiver because it can transmit and receive some control data or related information through a classical channel. That is, the transceiver 120, 220 may include a molecular transceiver and a classical transceiver that are physically separated or may include a molecular transceiver and a classical transceiver that are logically separated. Accordingly, the transceiver 120 is configured to transmit molecular information to a second device, that is, the reception device 200, through the classical channel and the molecular channel. In this case, the molecular information includes information about the channel state and/or channel diffusion (e.g., a molecular state). Furthermore, the transceiver 120 may receive feedback information (e.g., molecular channel information or correlation feedback) from the second device 200 through the classical channel.

The transceiver 120 transmits molecules, that is, an information carrier, through a channel and receives information about an H-diffusion function, that is, a function associated with the diffusion of the channel. In this case, the information received by the transceiver 120 may be information about the trajectory of N molecules on the time-space of the channel for the N molecules. The information received by the transceiver 120 may be information about a diffusion factor $\upsilon$ based on a mean square displacement $<|x|^2>$ according to the time of the molecules.

Furthermore, the information received by the transceiver 120 may include first information about a molecular diffusion parameter $\alpha$ which is obtained from information about a probability density function (PDF) for z, that is, H-variates associated with the H-diffusion of the molecules. In this case, the molecular diffusion parameter α may be associated with a molecular attenuation parameter.

Furthermore, the information received by the transceiver 120 may include second information about a Q-Q plot showing quantiles according to the molecular diffusion parameter α based on the quantiles of a reference diffusion parameter $\alpha_1$. In this case, a case where $\alpha_1=2$ may be the reference diffusion parameter. This shows a Gaussian distribution in which the mean is 0 and dispersion is 2. A Q-Q plot for different $\alpha_1=1.5$, 1.0 and 0.5 may be shown based on $\alpha_1=2$. In this case, first H-variates $z_1$ ($\alpha_1=2$, 1.5, 1.0, and 0.5) comply with the standard H-diffusion. A case where $\alpha_2=0.5$ may be the reference diffusion parameter. A Q-Q plot for different $\alpha_2=0.3$, 0.7 and 0.9 may be shown based on $\alpha_2=0.5$. In this case, second H-variates $z_2$ ($\alpha_2=\alpha_2=0.3$, 0.5, 0.7, and 0.9) comply with the standard H-diffusion.

The controller 110 controls a transmission property that the molecules are transmitted based on the received information about the H-diffusion function. Furthermore, the controller 110 may determine the energy amplitude level and modulation order (M-array) of the molecules based on the first information. For example, an increase in the transmission energy of molecules as the diffusion of a molecular channel increases may be taken into consideration. Furthermore, if a channel diffusion parameter is associated with channel attenuation, it is necessary to increase the transmission energy of molecules as the attenuation of a molecular channel increases.

As the transmission energy of molecules increases, the energy level of molecular particles transported to the second device 200 is increased. Accordingly, information of the molecular particles can be easily distinguished from surrounding noise. If the energy level is increased regardless of the diffusion of a molecular channel, the molecular particles are robust against surrounding noise, but power consumption of the first device 100 is increased. Accordingly, it is important to determine a transmission energy level by checking the diffusion property of a molecular channel. Furthermore, if the diffusion of a molecular channel is great, it is necessary to reduce the amount of information transmitted per molecular particle by reducing a modulation level. In contrast, if the diffusion of a molecular channel is small, it is necessary to increase the amount of information transmitted per molecular particle by reducing a modulation level. For example, if the diffusion of a molecular channel is small, information may be transmitted in different amplitude levels, for example, a first amplitude and a second amplitude.

Furthermore, the controller 110 may control transmission speed of information, a transport stream number N, and M-ary associated with the molecules based on the information about the trajectory of the molecules or the information about the diffusion factor υ. For example, if the diffusion factor is greater than 1 (i.e., υ>1), it may be called a super diffusion state. If υ=1, it may be called a normal diffusion state. If υ<1, it may be called a subdiffusion state. Accordingly, in the case of the super diffusion state according to υ>1, the amount of information transmitted per molecular particle is increased. In contrast, in the case of the subdiffusion state according to υ<1, the amount of information transmitted per molecular particle is reduced.

The transport stream number N may be a total number of available reception means of receive nanomachines or less. For example, if the second device 200 is plural, the first device 100 may transmit a plurality of transport streams N=2, 4, 8, 16 . . . , to the plurality of second devices 200 at the same time. For example, if the number of second devices 200 is 4, the first device 100 may transmit a maximum of four transport streams to the four second devices 200 at the same time although it can transmit four or more transport streams through independent transmission means (e.g., a (nano)antenna). Alternatively, the first device 100 transmits 8 or 16 transport streams to the second device 200 at the same time, but may redundantly transmit the same information.

If one receives nanomachine (i.e., the second device 200) includes a plurality of (nano)reception means, a transmit nanomachine (i.e., the first device 100) may transmit transport streams equal to or less than a total number of available reception means of the receive nanomachines. In this case, the transmit nanomachine (or first device 100) may transmit a plurality of transport streams so that some of the transport streams become the same information (or data).

The memory 130 may be configured to store molecular information according to an embodiment of the present invention and information associated with control information.

An operation of the second device, that is, the reception device 200, is described below. The transceiver 220 receives molecules, that is, an information carrier, through a channel and transmits information about an H-diffusion function, that is, a function associated with the diffusion of the channel. The information transmitted by the transceiver 220 may be information about the trajectory of N molecules on the time-space of the channel for N molecules.

The controller 210 decodes molecular information whose transmission property that transmits the molecules is controlled based on the received information about the H-diffusion function. The controller 210 estimates a mean square displacement $<|x|^2>$ according to the time of the molecules. Furthermore, the controller 210 may perform control so that information about a diffusion factor υ is transmitted through the transceiver based on the estimated mean square displacement $<|x|^2>$.

The transceiver 220 may transmit first information about a molecular diffusion parameter α obtained from information about the probability density function (PDF) of z, that is, H-variates associated with the H-diffusion of the molecules. Furthermore, the transceiver 220 may transmit second information about a Q-Q plot indicative of quantiles according to the molecular diffusion parameter α based on the quantiles of a reference diffusion parameter $\alpha_1$.

The controller 210 may determine an energy amplitude level of the molecules, determined by the first device, based on the first information. Furthermore, the controller 210 may receive the information carrier transmitted by the first device 100 based on the transmission speed of information, determined by the first device 100 and associated with the molecules, based on the second information through the transceiver, and may decode the information carrier. In this case, the transmission speed may be determined based on the information about the trajectory of the molecules or the information about the diffusion factor υ. The controller 210 may determine the speed at which the information carrier is decoded, and the rate may be determined based on the diffusion factor υ and a method of modulating the information carrier. For example, if the decoding speed is slower than a reference decoding speed, the controller 210 performs control so that information is stored in a buffer. In contrast, if the decoding speed is faster than the reference decoding speed, the controller may decode information from the buffer.

The memory 230 may be configured to store molecular information according to an embodiment of the present invention and information associated with control information.

A method of modeling a channel and transmitting or receiving molecules for passive transport molecular communication is described in detail below.

A. Subordination Methods

1) Parent-directing subordinate process: a stochastic process h(t) for the channel estimation (or modeling) of molecules (or particles), that is, h(t)=p(d(t)). In this case, τ=d(t), and a subordinate process d(t) is an increment random process. Accordingly, a spatial density function $p_h(x;t)$ is given as a spatial probability density function (PDF), such as Equation 1.

$$p_h(x;t) = \int_0^\infty p_p(x;\tau) p_d(\tau;t) d\tau \qquad (1)$$

2) Subordination for self-similar process: a stochastic process h(t) for the channel estimation (or modeling) of molecules (or particles) may be self-similar as in Equation 2.

$$h(c_1 t) \stackrel{d}{=} c_2 h(t). \qquad (2)$$

In this case, a single variable density function $p_x(x)$ satisfies Equation 3, and Equation 1 may be expressed as Equation 4.

$$p_p(x;\tau) = \tau^{-\omega_1} p_x\left(\frac{x}{\tau^{\omega_1}}\right) \qquad (3)$$

$$p_h(x;t) = \int_0^\infty p_x\left(\frac{x}{\tau^{\omega_1}}\right) p_d(\tau;t) \frac{d\tau}{\tau^{\omega_1}} \qquad (4)$$

3) Distribution of two insubordinate random variables: two insubordinate random variables z1 and z2 for the channel estimation (or modeling) of molecules (or particles) may be taken into consideration. In this case, PDFs are expressed into $p_{z1}(z1)$ and $p_{z2}(z2)$, respectively. Since the random variables z1 and z2 are independent, the PDF of z is expressed as in Equation 5 and satisfies the relations of Equations 6 to 8.

$$p_z(z) = \int_0^\infty p_{z_1}\left(\frac{z}{\zeta^{\omega_1}}\right) p_{z_2}(\zeta) \frac{d\zeta}{\zeta^{\omega_1}} \qquad (5)$$

$$p_p(x;\tau) = \frac{1}{\tau^{\omega_1}} p_{z_1}\left(\frac{x}{\tau^{\omega_1}}\right) \qquad (6)$$

$$p_d(\tau;t) = \frac{1}{t^{\omega_2}} p_{z_2}\left(\frac{\tau}{t^{\omega_2}}\right) \qquad (7)$$

$$p_h(x;t) = \frac{1}{t^{\omega_1 \omega_2}} p_z\left(\frac{x}{t^{\omega_1 \omega_2}}\right) \qquad (8)$$

B. H-Diffusion Model

A subordinate process having a self-similar parent process may be defined by anomalous diffusion. H-diffusion is arranged as follows in relation to the channel estimation (or modeling) of a molecular communication.

If a spatial density function indicated by ω (x,t;ω1,ω2) that varies over Definition 1 (H-diffusion) time may be generated by two H-variates, a self-similar probability process h(t) may be called an H-diffusion process. In this case, $z_1 \sim \mathcal{H}_{p_1,q_1}^{m_1,n_1}(|z_1|; \boldsymbol{\mathcal{P}}_1)$ that is non-negative or symmetric and $z_2 \sim \mathcal{H}_{p_2,q_2}^{m_2,n_2}(z_2; \boldsymbol{\mathcal{P}}_2)$ that is non-negative may be taken into consideration in the H-variates, and the H-variates satisfy Equations 9 and 10.

$$\omega(x, t; \omega_1, \omega_2) = \int_0^\infty \frac{1}{\tau^{\omega_1}} p_{z_1}\left(\frac{x}{\tau^{\omega_1}}\right) \frac{1}{t^{\omega_2}} p_{z_2}\left(\frac{\tau}{t^{\omega_2}}\right) d\tau \qquad (9)$$

$$\omega(x, t; \omega_1, \omega_2) = \frac{1}{t^{\omega_1 \omega_2}} p_z\left(\frac{x}{t^{\omega_1 \omega_2}}\right) \qquad (10)$$

In Equations 9 and 10, $z = z_1 \, z_2^{\omega_1}$ and $\omega_1, \omega_2 \in \mathbb{R}_{++}$ is satisfied.

Remark 1: H-distribution may have a wide statistical distribution, and a proposition related to the H-distribution corresponds to a convolution operation and is given as in Equation 11.

Proposition 1 (Generalized Convolution Operation): Let $f(t) = H_{p_2,q_2}^{m_2,n_2}(t; \boldsymbol{\mathcal{P}}_2)$. Then, $$\mathbb{H}_{p_1,q_1}^{m_1,n_1}\left\{\frac{\xi\omega}{t^\omega} f(\xi t^{-\omega}); \boldsymbol{\mathcal{P}}_1\right\}(s) = \qquad (11)$$

$$\xi^{1/\omega} H_{p_1+p_2,q_1+q_2}^{m_1+m_2,n_1+n_2}\left(s\xi^{1/\omega}; \boldsymbol{\mathcal{P}}_1 \boxdot \left(1, \frac{1}{\omega}, -\omega \middle| \boldsymbol{\mathcal{P}}_2^{-1}\right)\right)$$

where $\xi, \omega \in \mathbb{R}_{++}$.

This complies with an inverse operation and elementary operation, such as Equation 12.

$$LHS_{(11)} = \mathbb{H}_{p_1,q_1}^{m_1,n_1}\left\{\frac{\xi\omega}{t^\omega} H_{q_2,p_2}^{n_2,m_2}\left(\frac{t^\omega}{\xi}; \boldsymbol{\mathcal{P}}_2^{-1}\right); \boldsymbol{\mathcal{P}}_1\right\}(s) \qquad (12)$$

$$= \xi^{1/\omega} \mathbb{H}_{p_1,q_1}^{m_1,n_1}\left\{H_{q_2,p_2}^{n_2,m_2}\left(t; \left(1, \frac{1}{\omega}, -\omega \middle| \boldsymbol{\mathcal{P}}_2^{-1}\right)\right); \boldsymbol{\mathcal{P}}_1\right\}$$

$$(s\xi^{1/\omega})$$

Remark 2 (convolution operation): a generalized convolution operation of the proposition 1 is simplified into Mellin convolution as in Equation 13 when $\xi = \omega = 0$.

$$\mathbb{H}_{p_1,q_1}^{m_1,n_1}\left\{\frac{1}{t} f(t^{-1}); \boldsymbol{\mathcal{P}}_1\right\}(s) = \int_0^\infty H_{p_1,q_1}^{m_1,n_1}(st; \boldsymbol{\mathcal{P}}_1) H_{p_2,q_2}^{m_2,n_2} \qquad (13)$$

$$(t^{-1}; \boldsymbol{\mathcal{P}}_2) \frac{dt}{t}$$

$$= H_{p_1+p_2,q_1+q_2}^{m_1+m_2,n_1+n_2}(s; \boldsymbol{\mathcal{P}}_1 \boxdot \langle -1| \boldsymbol{\mathcal{P}}_2)$$

$$= H_{p_1+p_2,q_1+q_2}^{m_1+m_2,n_1+n_2}(s; \boldsymbol{\mathcal{P}}_1 \boxplus \boldsymbol{\mathcal{P}}_2).$$

Theorem 1 (green function of H-diffusion)

If $z_1 \sim \mathcal{H}_{p_1,q_1}^{m_1,n_1}(|z_1|; \boldsymbol{\mathcal{P}}_1)$ $z_2 \sim \mathcal{H}_{p_2,q_2}^{m_2,n_2}(z_2; \boldsymbol{\mathcal{P}}_2)$ is established and a parameter sequence is $\boldsymbol{\mathcal{P}}_i = (k_i, c_i, a_i, b_i, \mathcal{A}_i, \mathcal{B}_i)$, the green function ω(x,t; ω1, ω2) of H-diffusion is given as in Equation 14 in the form of H-transform in Definition 1.

$$\omega(x, t; \omega_1, \omega_2) = \qquad (14)$$

$$\frac{|x|^{1/\omega_1 - 1}}{\omega_1 t^{\omega_2}} \mathbb{H}_{p_2,q_2}^{m_2,n_2}\left\{\mathbb{H}_{q_1,p_1}^{n_1,m_1}\left(\tau; \left(1, \frac{1}{\omega_1}, -\omega_1 \middle| \boldsymbol{\mathcal{P}}_1^{-1}\right)\right); \boldsymbol{\mathcal{P}}_2\right\}\left(\frac{|x|^{1/\omega_1}}{t^{\omega_2}}\right)$$

The green function of H-diffusion is H-variate and given as in Equation 15, and the relations of Equations 16 and 17 are established.

$$\omega(x, t; \omega_1, \omega_2) \sim \mathcal{H}_{p1+p2,q1+q2}^{m_1+m_2,n_1+n_2}(|x|; \boldsymbol{\mathcal{P}}_{gf}|t^{\omega_1\omega_2})) \quad (15)$$

$$\boldsymbol{\mathcal{P}}_{gf} = \left(\frac{k_1 k_2}{c_2^{1-\omega_1}}, c_1 c_2^{\omega_1}, a_{gf}, b_{gf}, \mathcal{A}_{gf}, \mathcal{B}_{gf}\right) \quad (16)$$

$$\begin{cases} a_{gf} = (\dot{a}_2 + (1-\omega_1)\dot{\mathcal{A}}_2, a_1, \ddot{a}_2 + (1-\omega_1)\ddot{\mathcal{A}}_2) \\ b_{gf} = (\dot{b}_2 + (1-\omega_1)\dot{\mathcal{B}}_2, b_1, \ddot{b}_2 + (1-\omega_1)\ddot{\mathcal{B}}_2) \\ \mathcal{A}_{gf} = (\omega_1\dot{\mathcal{A}}_2, \mathcal{A}_1, \omega_1\ddot{\mathcal{A}}_2) \\ \mathcal{B}_{gf} = (\omega_1\dot{\mathcal{B}}_2, \mathcal{B}_1, \omega_1\ddot{\mathcal{B}}_2). \end{cases} \quad (17)$$

Proof: this complies with the generalized convolution operation of the proposition 1 as in Equation 18.

$$\begin{aligned}\omega(x, t; \omega_1, \omega_2) &= \frac{1}{t^{\omega_2}}\int_0^\infty H_{p1,q1}^{m_1,n_1}\left(\frac{|x|}{\tau^{\omega_1}}; \boldsymbol{\mathcal{P}}_1\right) H_{p2,q2}^{m_2,n_2}\left(\frac{\tau}{t^{\omega_2}}; \boldsymbol{\mathcal{P}}_2\right)\frac{d\tau}{\tau^{\omega_1}} \\ &= \frac{1}{t^{\omega_2}}\int_0^\infty \frac{1}{\omega_1|x|} H_{q1,p1}^{n_1,m_1}\left(\frac{\tau}{|x|^{1/\omega_1}}; \left(1, \frac{1}{\omega_1}, -\omega_1\right)\boldsymbol{\mathcal{P}}_1^{-1}\right) H_{p2,q2}^{m_2,n_2}\left(\frac{\tau}{t^{\omega_2}}; \boldsymbol{\mathcal{P}}_2\right) d\tau \\ &= \frac{|x|^{1/\omega_1-1}}{\omega_1 t^{\omega_2}} \boxplus_{p2,q2}^{m_2,n_2}\left\{H_{q1,p1}^{n_1,m_1}\left(\tau; \left(1, \frac{1}{\omega_1}, -\omega_1\right)\boldsymbol{\mathcal{P}}_1^{-1}\right); \boldsymbol{\mathcal{P}}_2\right\}\left(\frac{|x|^{1/\omega_1}}{t^{\omega_2}}\right).\end{aligned} \quad (18)$$

Remark 3 (simplified green function of H-diffusion): H-diffusion has a semi-similar property, and thus the green function ω(x,t; ω1, ω2) is expressed as in Equation 19 and called a simplified green function as in Equation 20.

$$\omega(x, t; \omega_1, \omega_2) = t^{-\omega_1\omega_2}\hat{\omega}\left(\frac{|x|}{t^{\omega_1\omega_2}}; \omega_1, \omega_2\right) \quad (19)$$

$$\hat{\omega}(x; \omega_1, \omega_2) = H_{p1+p2,q1+q2}^{m_1+m_2,n_1+n_2}(x; \boldsymbol{\mathcal{P}}_{gf}) \quad (20)$$

Corollary 1 (mean square displacement of H-diffusion): this is determined by the measurement of a deviation time between two particles and is given as in Equation 21.

$$\langle |x|^2 \rangle \sim t^{2\omega_1\omega_2} \quad (21)$$

Proof: the green function of Equation 15 may be expressed as Equation 22.

$$\langle |x|^2 \rangle = 2\mathbb{H}_{p1+p2,q1+q2}^{m_1+m_2,n_1+n_2}\{1; \langle 2|\boldsymbol{\mathcal{P}}_{gf}\} \quad (22)$$

Remark 4 (classification of H-diffusion): H-diffusion may be classified into three types of diffusion according to a diffusion factor $\upsilon=2\omega_1\omega_2$, i) a subdiffusion state if $0<\upsilon<1$, ii) a normal diffusion state if $\upsilon=1$, and iii) a super diffusion state if $\upsilon>1$.

C. Special Case

In this patent, various cases of H-diffusion are described below.

Case 1 (time-space fractional diffusion): z1 and z2, $\omega_1$, $\omega_2$ satisfy a condition, such as Equation 23, and parameters may satisfy Equation 24.

$$z_1 \sim \mathcal{H}_{2,2}^{1,1}(|z_1|; \boldsymbol{\mathcal{P}}_1) \quad (30)$$

$$z_2 \sim \mathcal{H}_{1,1}^{1,0}(z_2; \boldsymbol{\mathcal{P}}_2)$$

$$\omega_1 = 1/\alpha_{st}$$

$$\omega_2 = \beta_{st}$$

$$\boldsymbol{\mathcal{P}}_1 = \left(\frac{1}{\alpha_{st}}, 1, \left(1 - \frac{1}{\alpha_{st}}, \frac{1}{2}\right)\left(0, \frac{1}{2}\right), \left(\frac{1}{\alpha}, \frac{1}{2}\right), \left(1, \frac{1}{2}\right)\right) \quad (31)$$

$$\boldsymbol{\mathcal{P}}_2 = (1, 1, 1 - \beta_{st}, 0, \beta_{st}, 1) \quad (32)$$

H-diffusion is simplified into time-space part diffusion (ST-FD), the green function is given as in Equation 26, and a simplified green function is given as in Equation 27. In Equation 27, a parameter sequence is given as in Equation 28.

$$\omega_{\alpha_{st},\beta_{st}}(x, t) = t^{-\beta_{st}/\alpha_{st}}\hat{\omega}_{\alpha_{st},\beta_{st}}\left(\frac{|x|}{t^{\beta_{st}/\alpha_{st}}}\right) \quad (26)$$

$$\hat{\omega}_{\alpha_{st},\beta_{st}}(x) = \begin{cases} H_{3,3}^{2,1}(|x|; \boldsymbol{\mathcal{P}}_{st}), & \alpha_{st} \geq \beta_{st} \\ H_{3,3}^{1,2}(1/|x|; \boldsymbol{\mathcal{P}}_{st}^{-1}), & \alpha_{st} < \beta_{st} \end{cases} \quad (27)$$

-continued $$\boldsymbol{\mathcal{P}}_{st} = \left(\frac{1}{\alpha_{st}}, 1, \left(1 - \frac{1}{\alpha_{st}}, 1 - \frac{\beta_{st}}{\alpha_{st}}, \frac{1}{2}\right), \right. \quad (28)$$
$$\left.\left(1 - \frac{1}{\alpha_{st}}, 0, \frac{1}{2}\right), \left(\frac{1}{\alpha_{st}}, \frac{\beta_{st}}{\alpha_{st}}, \frac{1}{2}\right), \left(\frac{1}{\alpha_{st}}, 1, \frac{1}{2}\right)\right)$$

Remark 5 (limiting value of ST-FD): Equation 29 may be obtained using an arithmetic approximate expansion of an H-function.

$$\hat{\omega}_{\alpha_{st},\beta_{st}}(0) = \begin{cases} \dfrac{\csc(\pi/\alpha_{st})}{\alpha_{st}\Gamma(1-\beta_{st}/\alpha_{st})}, & \alpha_{st} \geq 1 \\ \dfrac{\Gamma(1-\alpha_{st})}{\pi\Gamma(1-\beta_{st})\csc(\pi\alpha_{st}/2)}, & \beta_{st} \leq \alpha_{st} < 1 \end{cases} \quad (29)$$

Remark 6 (special case of ST-FD): ST-FD may be discovered in plasma turbulence and may also be applied to the approximation of a genotype expression profile. ST-FD may be classified into i) standard diffusion for $\alpha_{st}=2$, $\beta_{st}=1$; i) spatial part diffusion for $0<\alpha_{st}\leq 2$, $\beta_{st}=1$; iii) time part diffusion for $\alpha_{st}=2$, $0<\beta_{st}\leq 1$, $\beta_{st}=1$; iv) neutral fraction diffusion for $0<\alpha_{st}=\beta_{st}\leq 1$.

Case 2 (some diffusion): in relation to some diffusion, z1 and z2, $\omega_1$, $\omega_2$ may satisfy a condition, such as Equation 30, and a parameter sequence may satisfy Equations 31 and 32.

$$z_1 \sim \mathcal{H}_{0,1}^{1,0}(|z_1|; \boldsymbol{\mathcal{P}}_1) \quad (30)$$

$$z_2 \sim \mathcal{H}_{1,1}^{1,0}(z_2; \boldsymbol{\mathcal{P}}_2)$$

$$\omega_1 = 1/2$$

$$\omega_2 = \alpha_{ek}$$

$$\boldsymbol{\mathcal{P}}_1 = \left(\frac{1}{4\sqrt{\pi}}, \frac{1}{2}, -, 0, -, \frac{1}{2}\right) \quad (31)$$

$$\boldsymbol{\mathcal{P}}_2 = (1, 1, 1 - \beta_{ek}, 0, \beta_{ek}, 1) \quad (32)$$

H-diffusion is simplified into EK-FD diffusion, a green function corresponding to the EK-FD diffusion may be expressed as Equation 33, a simplified green function may be expressed as Equation 34, and the parameters of Equation 34 are expressed into Equation 35.

$$\omega_{\alpha_{ek},\beta_{ek}}(x,t) = t^{-\alpha_{ek}/2}\hat{\omega}_{\alpha_{ek},\beta_{ek}}\left(\frac{|x|}{t^{\alpha_{ek}/2}}\right) \quad (33)$$

$$\hat{\omega}_{\alpha_{ek},\beta_{ek}}(x) = H_{1,2}^{2,0}(|x|; \boldsymbol{P}_{ek}) \quad (34)$$

$$\boldsymbol{P}_{ek} = \left(\frac{1}{4\sqrt{\pi}}, \frac{1}{2}, 1 - \frac{\beta_{ek}}{2}, \left(\frac{1}{2}, 0\right), \frac{\beta_{ek}}{2}, \frac{1}{2}1_2\right) \quad (35)$$

Remark 7 (special case $\langle |x|^2 \rangle \sim t^{\alpha_{ek}}$ of EK-FD): EK-FD may correspond to a gray brown motion, and some (portion) brown signals may be applied to regional flow distributions of the heart, lung, and kidney. EK-FD may be classified into four types of diffusion as in Equation 36 using a mean square displacement.

$$\begin{cases} 0 < \alpha_{ek} < 1, & \text{subdiffusion (slow type)} \\ 1 < \alpha_{ek} \leq 2, & \text{superdiffusion (fast type)} \\ \alpha_{ek} = \beta_{ek} = 1, & \text{standard normal diffusion with Gaussian PDF} \\ \alpha_{ek} = 1, \beta_{ek} \neq 1, & \text{quasi normal diffusion with Gaussian PDF} \end{cases} \quad (36)$$

Alternatively, EK-FD may be classified into some brown motions ($0 < \alpha_{st} \leq 2$, $\beta_{st}=1$), some diffusion ($0 < \alpha_{st} \leq \beta_{st} \leq 2$, $\beta_{st} < 1$) or a gray brown motion, and a standard brown motion ($\alpha_{st}=\beta_{st}=1$) depending on a diffusion parameter.

Definition 2 (standard H-diffusion): z1 and z2 satisfy conditions, such as Equations 37 and 38, and a parameter sequence may satisfy Equations 39 and 40.

$$z_1 \sim \mathcal{H}_{2,2}^{1,1}(|z_1|; \boldsymbol{P}_1|\beta_1)) \quad (37)$$

$$z_2 \sim \mathcal{H}_{1,1}^{1,0}(|z_2|; \boldsymbol{P}_2|\beta_2)) \quad (38)$$

$$\boldsymbol{P}_1 = \left(\frac{1}{\alpha_1}, 1, \left(1 - \frac{1}{\alpha_1}, \frac{1}{2}\right), \left(0, \frac{1}{2}\right), \left(\frac{1}{\alpha_1}, \frac{1}{2}\right), \left(1, \frac{1}{2}\right)\right) \quad (39)$$

$$\boldsymbol{P}_2 = (1, 1, 1 - \alpha_2, 0, \alpha_2, 1) \quad (40)$$

Corollary 2 (green function of standard H-diffusion): the green function of standard H-diffusion is an H-variate and given as in Equation 41, and a parameter sequence is given as in Equation 42.

$$\omega(x, t; \omega_1, \omega_2) \sim \mathcal{H}_{3,3}^{2,1}(|x|; \boldsymbol{P}_{std}|\beta_1\beta_2^{\omega_1}t^{\omega_1\omega_2})) \quad (41)$$

$$\boldsymbol{P}_{std} = \left(\frac{1}{\alpha_1}, 1, \left(1 - \frac{1}{\alpha_1}, \frac{1}{2}, 1 - \omega_1\alpha_2\right), \left(1 - \omega_1, 0, \frac{1}{2}\right),\right. \quad (42)$$

$$\left.\left(\frac{1}{\alpha_1}, \frac{1}{2}, \omega_1\alpha_2\right), \left(\omega_1, 1, \frac{1}{2}\right)\right)$$

Remark 8 (standard H-diffusion): the first H-variate $z_1$ of standard H-diffusion complies with a stabilization distribution, that is, $z_1 \sim (\alpha_1, 0, \beta_1^{\alpha_1}, 0)$ having a property exponent $\alpha_1$ and a scaling factor $\beta_1^{\alpha_1}$. In contrast, the second H-variate $z_2$ is distributed to an M-Wright function having a parameter $\alpha_1$ and a scaling factor $\beta_2$. $z_2$ may be obtained from non-negative strict stabilization random variables $z_2 \sim (\alpha_2, 1, \cos(\pi\alpha/2)/(\beta_2, 0)$, and complies with Equation 43.

$$z_2 \sim s^{-\alpha_2} \quad (43)$$

Standard H-diffusion well describes various typical anomalous diffusion models having a scaling parameter $\beta_1 = \beta_2 = 1$ as below: i) ST-FD having a parameter set ($\alpha_1$, $\alpha_2$, $\omega_1$, $\omega_2$)=($\alpha_{st}$, $\beta_{st}$, $1/\alpha_{st}$, $\beta_{st}$); ii) EK-FD having ($\alpha_1$, $\alpha_2$, $\omega_1$, $\omega_2$)=(2, $\beta_{ek}$, $\beta_{st}$, ½, $\alpha_{ek}$); iii) a gray brown motion if ($\alpha_1$, $\alpha_2$, $\omega_1$, $\omega_2$)=(2, $\alpha_{ek}$, $\beta_{st}$, ½, $\alpha_{ek}$), and iv) standard normal diffusion (brown motion) having ($\alpha_1$, $\alpha_2$, $\omega_1$, $\omega_2$)=(2, 1, ½, 1).

Remark 9 (roles of scaling parameter and diffusion coefficient): the two positive scaling parameters $\beta_1$ and $\beta_2$ correspond to standard H-diffusion determined by a diffusion medium. In such a framework, the standard H-diffusion has an equivalent diffusion equation, such as Equation 44. Furthermore, the relation between the scaling parameter and a diffusion coefficient K is given by Equation 45.

$$\frac{\partial^{\alpha_2}}{\partial t^{\alpha_2}}\omega(x,t) = \beta_1^{\alpha_1}\beta_2\frac{\partial^{\alpha_1}}{\partial |x|^{\alpha_1}}\omega(x,t) \quad (44)$$

$$K = \beta_1^{\alpha_1}\beta_2 \quad (45)$$

Table 1 shows typical anomalous diffusion as a special case of H-diffusion in relation to an embodiment of the present invention.

TABLE 1

| Diffusion | | Parent process $z_1 \sim \mathcal{H}$ ($O_1$, $\boldsymbol{P}_1$) | | Directing process $z_2 \sim \mathcal{H}$ ($O_2$, $\boldsymbol{P}_2$) | | |
|---|---|---|---|---|---|---|
| h(t) | $O_1$ | $\boldsymbol{P}_1$ | $O_2$ | $\boldsymbol{P}_2$ | $\omega_1$ | $\omega_2$ |
| ST-FD | (1, 1, 2, 2) | $\left(\frac{1}{\alpha_{st}}, 1, \left(1 - \frac{1}{\alpha_{st}}, \frac{1}{2}\right), \left(0, \frac{1}{2}\right), \left(\frac{1}{\alpha_{st}}, \frac{1}{2}\right), \left(1, \frac{1}{2}\right)\right)$ | (1, 0, 1, 1) | (1, 1, 1 − $\beta_{st}$, 0, $\beta_{st}$, 1) | $1/\alpha_{st}$ | $\beta_{st}$ |
| S-FD | (1, 1, 2, 2) | $\left(\frac{1}{\alpha_{st}}, 1, \left(1 - \frac{1}{\alpha_{st}}, \frac{1}{2}\right), \left(0, \frac{1}{2}\right), \left(\frac{1}{\alpha_{st}}, \frac{1}{2}\right), \left(1, \frac{1}{2}\right)\right)$ | (0, 0, 0, 0) | (1, 1, −, −, −, −) | $1/\alpha_{st}$ | 1 |
| T-FD | (1, 0, 1, 1) | (½, 1, 0, ½, 1) | (1, 0, 1, 1) | (1, 1, 1 − $\beta_{st}$, 0, $\beta_{st}$, 1) | 1/2 | $\beta_{st}$ |
| EK-FD | (1, 0, 0, 1) | $\left(\frac{1}{4\sqrt{\pi}}, \frac{1}{2}, -, 0, -, \frac{1}{2}\right)$ | (1, 0, 1, 1) | (1, 1, 1 − $\beta_{ek}$, 0, $\beta_{ek}$, 1) | 1/2 | $\alpha_{ek}$ |
| GBM | (1, 0, 0, 1) | $\left(\frac{1}{4\sqrt{\pi}}, \frac{1}{2}, -, 0, -, \frac{1}{2}\right)$ | (1, 0, 1, 1) | (1, 1, 1 − $\alpha_{ek}$, 0, $\alpha_{ek}$, 1) | 1/2 | $\alpha_{ek}$ |

TABLE 1-continued

| Diffusion | Parent process $z_1 \sim \mathcal{H}(O_1, \mathcal{P}_1)$ | | Directing process $z_2 \sim \mathcal{H}(O_2, \mathcal{P}_2)$ | | | |
| --- | --- | --- | --- | --- | --- | --- |
| h(t) | $O_1$ | $\mathcal{P}_1$ | $O_2$ | $\mathcal{P}_2$ | $\omega_1$ | $\omega_2$ |
| FBM | (1, 0, 0, 1) | $\left(\frac{1}{4\sqrt{\pi}}, \frac{1}{2}, -, 0, -, \frac{1}{2}\right)$ | (0, 0, 0, 0) | (1, 1, -, -, -, -) | 1/2 | $\alpha_{ek}$ |
| BM | (1, 0, 0, 1) | $\left(\frac{1}{4\sqrt{\pi}}, \frac{1}{2}, -, 0, -, \frac{1}{2}\right)$ | (0, 0, 0, 0) | (1, 1, -, -, -, -) | 1/2 | 1 |

(Note) $\alpha_{sf}, \alpha_{ek} \in (0, 2]$, $\beta_{sf}, \beta_{ek} \in (0, 1]$, $\omega_1, \omega_2 \in \mathbb{R}_{++}$, $H_{0,0}^{0,0}(z; (k, 1, -, -, -, -)) = k\delta(z-1)$, $k \in \mathbb{R}_{++}$

D. Numerical Example

Figure 3:
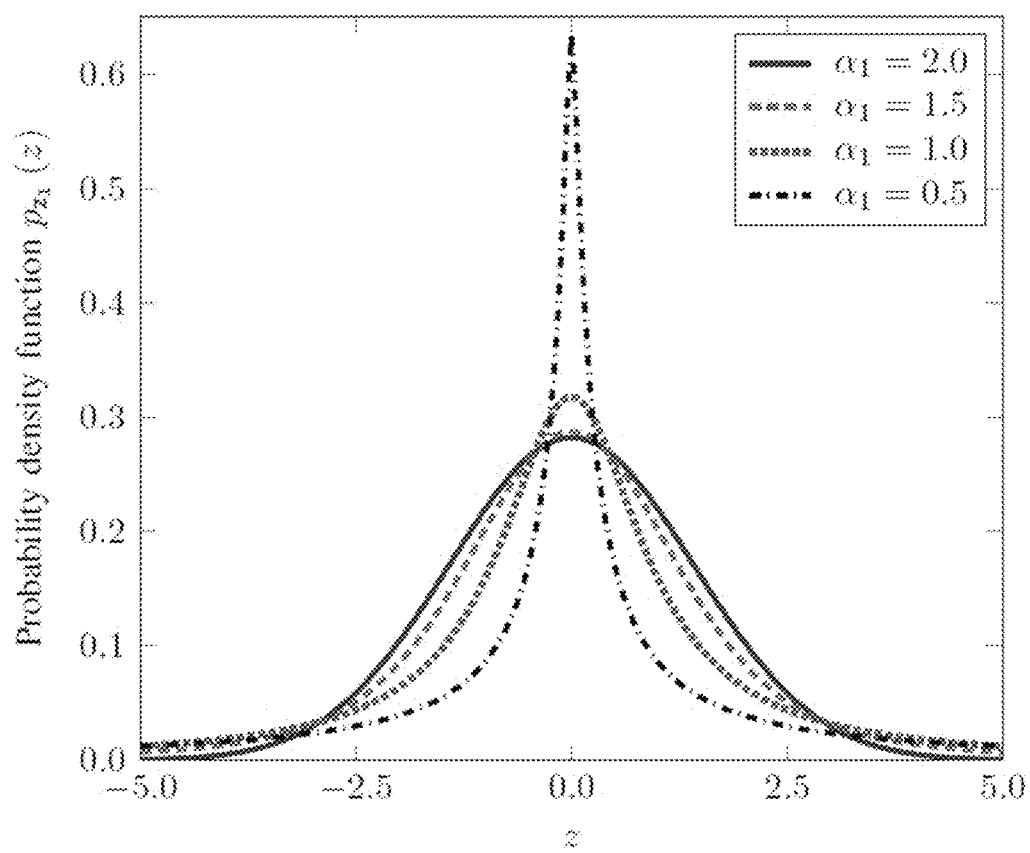
FIG. 3 shows a PDF of $z_1$ according to a change of $\alpha$ in standard H-diffusion according to an embodiment of the present invention.
Figure 4:
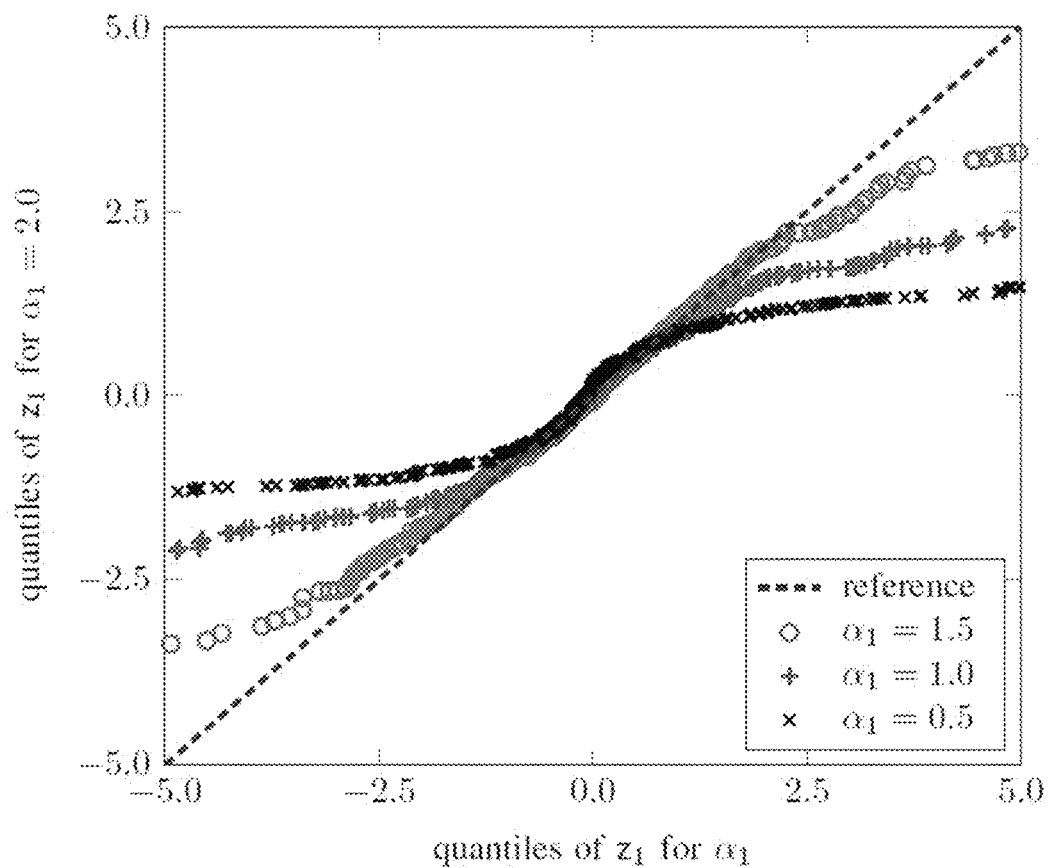
FIG. 4 shows a Q-Q plot showing the quantiles of $z_1$ according to a change of $\alpha$ in standard H-diffusion according to an embodiment of the present invention.
Figure 5:
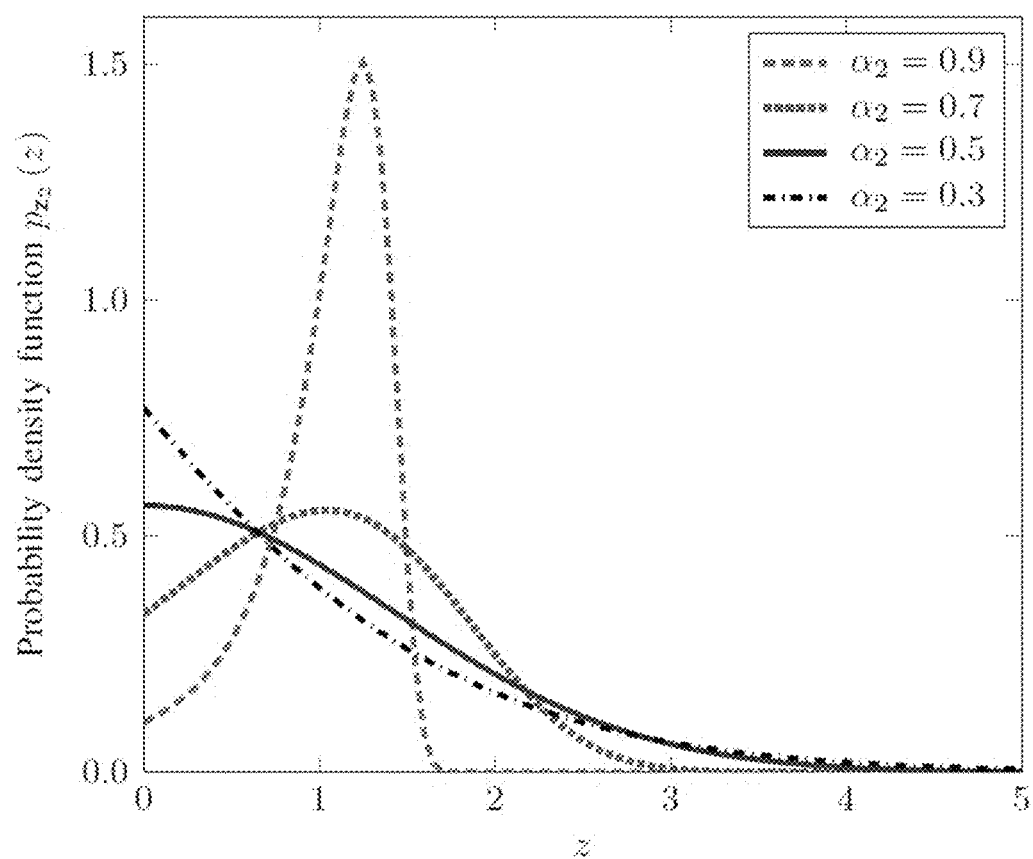
FIG. 5 shows a PDF of $z_2$ according to a change of $\alpha$ in standard H-diffusion according to an embodiment of the present invention.
Figure 6:
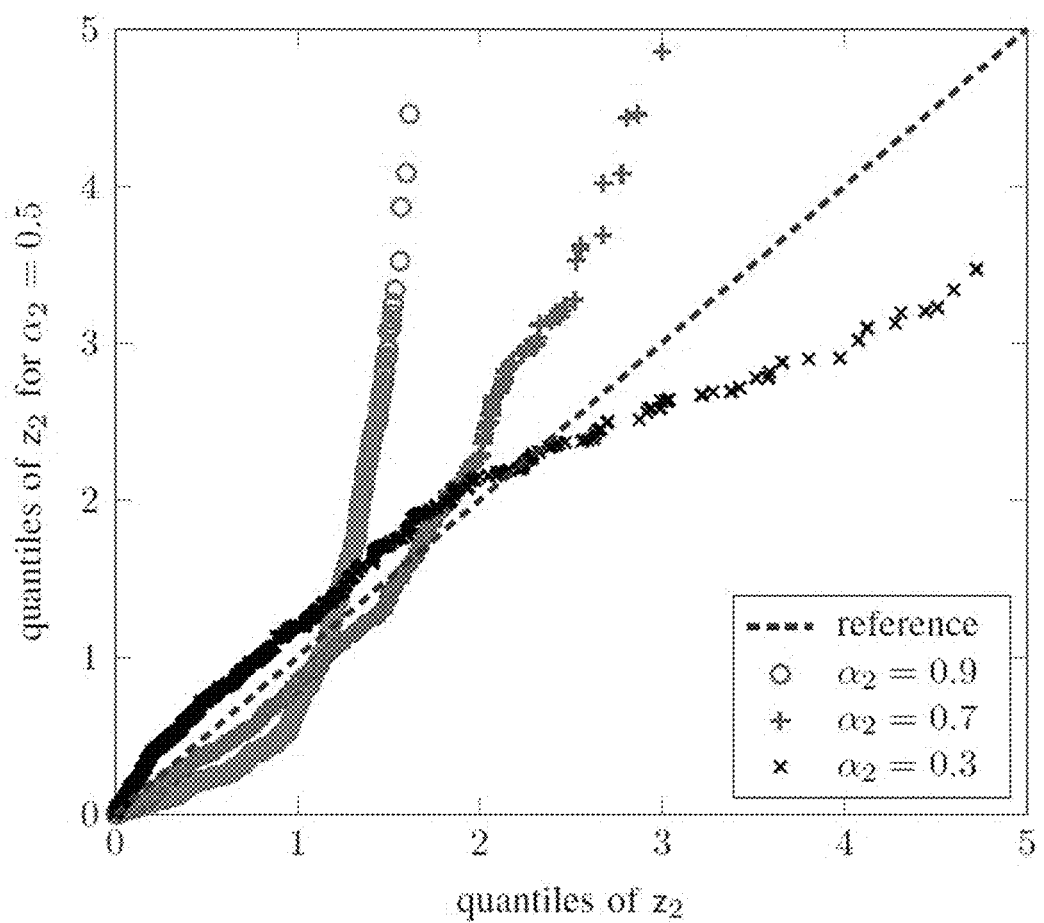
FIG. 6 shows a Q-Q plot showing the quantiles of $z_2$ according to a change of $\alpha$ in standard H-diffusion according to an embodiment of the present invention.

FIG. 3 shows a PDF of $z_1$ according to a change of α in the standard H-diffusion according to an embodiment of the present invention. FIG. 4 shows a Q-Q plot showing the quantiles of $z_1$ according to a change of α in the standard H-diffusion according to an embodiment of the present invention. Furthermore, FIG. 5 shows a PDF of $z_2$ according to a change of α in standard H-diffusion according to an embodiment of the present invention. FIG. 6 shows a Q-Q plot showing the quantiles of $z_2$ according to a change of α in standard H-diffusion according to an embodiment of the present invention. In FIGS. 3 to 6, it may be seen that a distribution of $z_1$ is further widened due to a reduction of $\alpha_1$. In contrast, it may be seen that a distribution of $z_2$ is further widened due to an increase of $\alpha_2$.

III. H-NOISE MODELING

A method of modeling H-noise affecting efficient transport between two nanomachines is described.

A. H-Noise Model

If the random release time of molecules in a transmit nanomachine (TN) is "s", the arrival time "y" of the molecules in a receive nanomachine (RN) is expressed as in Equation 46. In this case, "t" is the addition random time of the molecules that reach the RN.

$$y = s + t \quad (46)$$

Theorem 2 (first passage time of H-diffusion molecules): it is defined in Equation 47 that the first passage time "t" starts at x=0 and reaches x=a. The first passage time of H-diffusion molecules is an H-variate and is expressed as in Equation 48. In this case, the parameter sequence of Equation 48 is given as in Equation 49.

Proof: a density function for the position of molecules at the time "t" is given as in Equation 50 using an absorption boundary condition $\omega(x,0; \omega_1, \omega_2)=0$. A survival probability that molecules may be discovered in "x<a" during the entire time up to the time "t" is expressed as in Equation 51.

$$\omega(x, t; a) = \omega(x, t; \omega_1, \omega_2) - \omega(-x + 2a, t; \omega_1, \omega_2) \quad (50)$$

$$p_t(t) \stackrel{(a)}{=} \frac{\partial S_T(t)}{\partial t} \quad (51)$$

$$\stackrel{(b)}{=} -\frac{\partial}{\partial t} \int_{-\infty}^{a/t^{\omega_1 \omega_2}} \hat{\omega}(y; \omega_1, \omega_2) dy + \int_{a/t^{\omega_1 \omega_2}}^{\infty} \hat{\omega}(y; \omega_1, \omega_2) dy$$

$$\stackrel{(c)}{=} -2 \frac{\partial}{\partial t} \int_0^{a/t^{\omega_1 \omega_2}} \hat{\omega}(y; \omega_1, \omega_2) dy$$

$$= \frac{2a\omega_1 \omega_2}{t^{\omega_1 \omega_2 + 1}} \hat{\omega}\left(\frac{a}{t^{\omega_1 \omega_2}}; \omega_1, \omega_2\right)$$

Definition 3 (H-noise): the first passage time of the standard H-diffusion molecules of Definition 2 is defined as standard H-noise.

Remark 10 (standard H-noise): the standard H-noise is an H-variate, such as Equation 52, and a parameter sequence is expressed as in Equation 53.

$$t_{sHn} \sim \mathcal{H}_{3,3}^{1,2}\left(\mathcal{P}_{sHn} \left| \left(\frac{a}{\beta_1 \beta_2^{\omega_1}}\right)^{1/(\omega_1 \omega_2)}\right.\right) \quad (52)$$

$$\mathcal{P}_{sHn} = \left(\frac{2}{\alpha_1}, 1, \left(-\frac{1}{\omega_2}, -\frac{1}{\omega_1 \omega_2}, -\frac{1}{2\omega_1 \omega_2}\right), \right. \quad (53)$$
$$\left(-\frac{1}{\alpha_1 \omega_1 \omega_2}, -\frac{1}{2\omega_1 \omega_2}, \frac{\alpha_2}{\omega_2}\right), \left(\frac{1}{\omega_2}, \frac{1}{\omega_1 \omega_2}, \frac{1}{2\omega_1 \omega_2}\right),$$
$$\left.\left(\frac{1}{\alpha_1 \omega_1 \omega_2}, \frac{1}{2\omega_1 \omega_2}, \frac{\alpha_2}{\omega_2}\right)\right)$$

$$t = \inf\{t : x(t) = a\} \quad (47)$$

$$t \sim \mathcal{H}_{q_1+q_2, p_1+p_2}^{n_1+n_2, m_1+m_2}(\mathcal{P}_{Hn} | (ac_{gf}^{1/(\omega_1 \omega_2)})) \quad (48)$$

$$\mathcal{P}_{Hn} = (1, 1, /(\omega_1 \omega_2), -(1+\omega_1 \omega_2)(\mathcal{P}_{gf}^{-1} \boxplus \mathcal{P}_{k \to 2}) \quad (49)$$
$$= \left(\frac{2k_{gf}}{c_{gf}}, 1, \left(1 - b_{gf} - \mathcal{B}_{gf} - \frac{\mathcal{B}_{gf}}{\omega_1 \omega_2}\right), \left(1 - a_{gf} - \mathcal{A}_{gf} - \frac{\mathcal{A}_{gf}}{\omega_1 \omega_2}\right), \frac{\mathcal{B}_{gf}}{\omega_1 \omega_2}, \frac{\mathcal{A}_{gf}}{\omega_1 \omega_2}\right)$$

B. H-Noise Power

Fractional lower order statistics (FLOS) may be useful in analyzing measuring and analyzing the behavior of an impulse signal having such a distribution. The concept of H-noise power using a finite log moment based on $0^{th}$ statistics is reviewed below.

Theorem 3 (H-noise tail): An H-noise tail in the normal state after time sufficiently elapses is expressed as in Equations 54 and 55, and "$t_{Hn}$" is a tail constant.

$$\kappa \triangleq \lim_{t \to \infty} \frac{-\log S_{t_{Hu}}(t)}{\log t} \quad (54)$$

$$\kappa = \omega_1 \omega_2 \cdot \min_{j=1,\ldots,m_1+m_2} \left\{ 1 + \frac{\Re(b_{gf,j})}{\mathcal{B}_{gf,j}} \right\} \quad (55)$$

Proof: a relation of Equation 56 is established with respect to the accumulated distribution function of an H-variate.

$$S_{\tau_{Hn}}(t) = \mathbb{P}\{\tau_{Hn} > t\} \quad (56)$$

$$= 1 - \mathbb{H}_{q_1+q_2,p_1+p_2}^{n_1+n_2,m_1,m_2}$$

$$\left\{ \frac{1}{t} \mathbb{1}_{[0,1]}(t); \langle 1|(\mathcal{P}_{Hn}|(ac_{gf})^{1/(\omega_1 \omega_2)}) \rangle \right\}$$

$$= H_{q_1+q_2+1,p_1+p_2+1}^{n_1+n_2+1,m_1+m_2}$$

$$(t; \mathcal{P}_{cdf}^{-1} \boxplus \langle 1|(\mathcal{P}_{Hn}|(ac_{gf})^{1/(\omega_1 \omega_2)}) \rangle)$$

$$= H_{q_1+q_2+1,p_1+p_2+1}^{n_1+n_2+1,m_1+m_2}\left( \frac{t}{(ac_{gf})^{1/(\omega_1 \omega_2)}}; \mathcal{P}_{cdf}^{-1} \boxplus \langle 1|\mathcal{P}_{Hn} \rangle \right).$$

Equation 57 may be obtained using the arithmetic approximate expansion of the H-function.

$$\{t_{Hn} > t\} \doteq H_{q_1+q_2+1,p_1+p_2+1}^{n_1+n_2+1,m_1+m_2}(t; \mathcal{P}_{cdf}^{-1} \boxplus \langle 1|\mathcal{P}_{Hn} \rangle) \quad (57)$$

$$\doteq t^{-\omega_1 \omega_2 \cdot \min_{j=1,\ldots,m_1+m_2}\left\{1 + \frac{\Re(b_{g,f})}{\mathcal{B}_{gf,j}}\right\}}$$

Remark 11 (arithmetic tail or heavy-tail distribution): the H-noise may be considered to be an arithmetic tail random variable because the tail function has a polynomial decay rate. Furthermore, all of arithmetic tail random variables may be considered to have a heavy-tail compared to an exponent distribution family.

Remark 12 (standard H-noise tail): the tail constant for the standard H-noise is given as in Equation 58.

$$\kappa_{sHn} = \begin{cases} \omega_1 \omega_2, & \omega_1 < 1 \\ \omega_2, & \omega_1 \geq 1 \end{cases} \quad (58)$$

Theorem 4 (log moment of H-noise): a specific arithmetic tail distribution has a finite log moment. Accordingly, the log moment of H-noise is given as in Equations 59 and 60 with respect to all range of parameters.

$$\mathbb{E}\{\ln(t_{Hn})\} = \mathbb{H}_{2,2}^{2,2}\{(t-1)p_{t_{Hn}}(t); \mathcal{P}_{ln}\} \quad (59)$$

$$\mathbb{E}\{\ln(t_{Hn})\} = H_{p_1+p_2+2,q_1+q_2+2}^{m_1+m_2+2,n_1+n_2+2}\left(1; \mathcal{P}_{ln} \boxplus \langle 1|(\mathcal{P}_{Hn}|(ac_{gf})^{\frac{1}{\omega_1 \omega_2}}) \rangle\right) - \quad (60)$$

$$H_{p_1+p_2+2,q_1+q_2+2}^{m_1+m_2+2,n_1+n_2+2}\left((ac_{gf})^{\frac{1}{\omega_1 \omega_2}}; \mathcal{P}_{ln} \boxplus \mathcal{P}_{Hn}\right)$$

In this case, the parameter sequence of Equation 59 is $\langle_{ln} = (1, 1, (0_2, -), (0_2, -), (1_2, -), (1_2, -))$. The log moment of H-noise is simplified as in Equation 61 with respect to the standard H-noise. In this case, $\gamma$ is a constant and is about 0.57721.

$$\mathbb{E}\{\ln(t_{sHn})\} = \left(\frac{1 - 1/\alpha_1 + (1 - \alpha_2)\omega_1}{\omega_1 \omega_2}\right)\gamma + \frac{1}{\omega_1 \omega_2} \ln\left(\frac{\alpha}{\beta_1 \beta_2^{\omega_1}}\right) \quad (61)$$

proof: a relation equation of Equation 62 is obtained using the relation between the log moment and the differential of a moment with respect to the standard H-noise.

$$\mathbb{E}\{\ln(t_{sHn})\} = \left. \frac{\partial \mathbb{E}\{t_{sHn}^\ell\}}{\partial \ell} \right|_{\ell=0} \quad (62)$$

Collary 3 (geometric power of standard H-noise: Equation 63 is geometric power of a random variable t. The geometric power of H-noise has been obtained by substituting "t" in Equation 63 with "$t_{Hn}$", and is expressed as in Equation 64.

$$\mathcal{P}(t) \triangleq \{\mathbb{E}\{\ln(t)\}\} \quad (63)$$

$$\mathcal{P}(t_{sHn}) = \left(\frac{a\mathcal{G}^{1-1/\alpha_1 + (1-\alpha_2)\omega_1}}{\beta_1 \beta_2^{\omega_1}}\right)^{\frac{1}{\omega_1 \omega_2}} \quad (64)$$

Remark 13 (geometric average, power, and FLOS): the geometric power has the relation of a geometric average of a non-negative random variable "t" as in Equation 65.

$$\mathcal{P}(t) = \exp\left\{ \lim_{N \to \infty} \frac{1}{N} \sum_{i=1}^{N} \ln(t_i) \right\} = \lim_{N \to \infty} \left\{ \prod_{i=1}^{N} t_i \right\}^{1/N} \quad (65)$$

If there is a sufficiently small value l satisfying Equation 66, the geometric power may be associated with the FLOS method.

$$\mathcal{P}(t) = \lim_{\ell \to 0} \{\mathbb{E}\{t^\ell\}\}^{1/\ell} \quad (66)$$

This shows that the geometric power may be used as a rich set of heavy-tailed distributions mathematically and conceptually.

Remark 14 (in a special case): in a brown motion not having a drift, the H-noise "$t_{Hn}$" has a non-negative stabilization distribution having a property exponent ½. In this case, a PDF is given as in Equation 67. Furthermore, corresponding geometric power is given as in Equation 68.

$$p_{t_{Hn}}(t) = \frac{4}{n^2\sqrt{\pi}} H_{1,0}^{0,1}\left[\frac{4t}{a^2}\bigg|\begin{pmatrix}-\frac{1}{2},1\end{pmatrix}\right] \qquad (67)$$

$$= \frac{a}{\sqrt{4\pi t^3}} \exp\left(-\frac{a^2}{4t}\right)$$

$$\mathcal{P}(t_{Hn}) = a^2 \mathcal{G} \qquad (68)$$

Table 2 shows the H-noise "t" for typical anomalous diffusion in Table 1 and geometric power thereof.

TABLE 2

$t \sim \mathcal{H}(O, \mathcal{P} |a^{1/\omega}))$, $P(t) = a^{1/\omega} G^{1/\omega-c}$

| Diffusion | | H-noise $t \sim \mathcal{H}(O, \mathcal{P})$ | | Geometric Power $\mathcal{P}(t)$ | |
|---|---|---|---|---|---|
| h(t) | O | | $\mathcal{P}$ | $\omega$ | c |
| ST-FD | (1, 2, 3, 3) | $\left(\frac{2}{\alpha_{st}}, 1, \left(-\frac{1}{\beta_{st}}, -\frac{\alpha_{st}}{\beta_{st}}, -\frac{\alpha_{st}}{2\beta_{st}}\right), \left(-\frac{1}{\beta_{st}}, -\frac{\alpha_{st}}{2\beta_{st}}, -1\right), \left(\frac{1}{\beta_{st}}, \frac{\alpha_{st}}{\beta_{st}}, \frac{\alpha_{st}}{2\beta_{st}}\right), \left(\frac{1}{\beta_{st}}, \frac{\alpha_{st}}{2\beta_{st}}, 1\right)\right)$ | | $\beta_{st}/\alpha_{st}$ | 1 |
| S-FD | (1, 1, 2, 2) | $\left(\frac{2}{\alpha_{st}}, 1, \left(-\alpha_{st}, -\frac{\alpha_{st}}{2}\right), \left(-1, \frac{\alpha_{st}}{2}\right), \left(\alpha_{st}, \frac{\alpha_{st}}{2}\right), \left(1, \frac{\alpha_{st}}{2}\right)\right)$ | | $1/\alpha_{st}$ | 1 |
| T-FD | (0, 1, 1, 1) | $\left(1, 1, -\frac{2}{\beta_{st}}, -1, \frac{2}{\beta_{st}}, 1\right)$ | | $\beta_{st}/2$ | 1 |
| EK-FD | (0, 2, 2, 1) | $\left(\frac{4^{1/\alpha_{ek}}}{\sqrt{\pi}}, 4^{1/\alpha_{ek}}, \left(-\frac{1}{\alpha_{ek}}, \frac{1}{2} - \frac{1}{\alpha_{ek}}\right), -\frac{\beta_{ek}}{\alpha_{ek}}, \frac{1}{\alpha_{ek}} 1_2, \frac{\beta_{ek}}{\alpha_{ek}}\right)$ | | $\alpha_{ek}/2$ | $\beta_{ek}/\alpha_{ek}$ |
| GBM | (0, 2, 2, 1) | $\left(\frac{4^{1/\alpha_{ek}}}{\sqrt{\pi}}, 4^{1/\alpha_{ek}}, \left(-\frac{1}{\alpha_{ek}}, \frac{1}{2} - \frac{1}{\alpha_{ek}}\right), -1, \frac{1}{\alpha_{ek}} 1_2, 1\right)$ | | $\alpha_{ek}/2$ | 1 |
| FBM | (0, 1, 1, 0) | $\left(\frac{4^{1/\alpha_{ek}}}{\sqrt{\pi}}, 4^{1/\alpha_{ek}}, \frac{1}{2} - \frac{1}{\alpha_{ek}}, --, \frac{1}{\alpha_{ek}}, --\right)$ | | $\alpha_{ek}/2$ | $1/\alpha_{ek}$ |
| BM | (0, 1, 1, 0) | $\left(\frac{4}{\sqrt{\pi}}, 4, -\frac{1}{2}, --, 1, --\right)$ | | 1/2 | 1 |

C. Numerical Example

Figure 8:
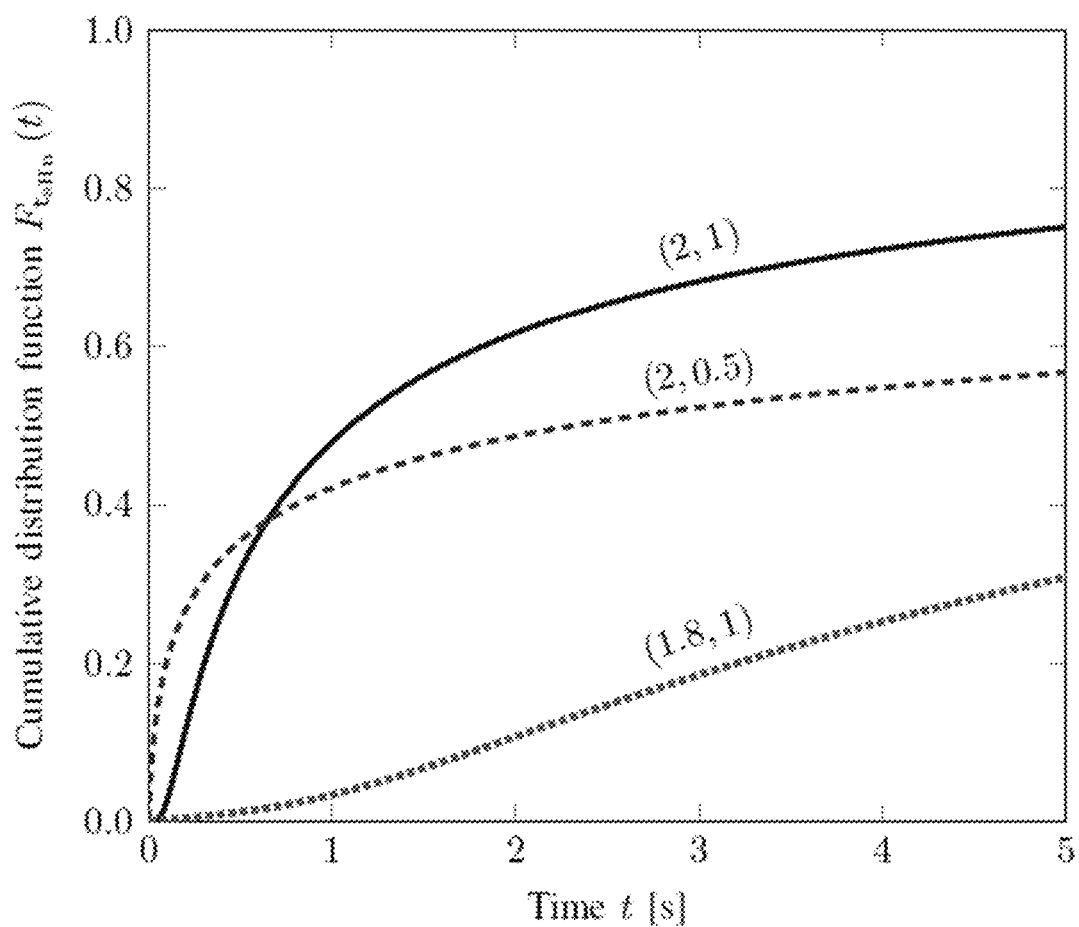
FIG. 8 shows the CDF of standard H-noise in H-diffusion in a $=10^{-5}$ m for three scenarios according to an embodiment of the present invention.
Figure 9:
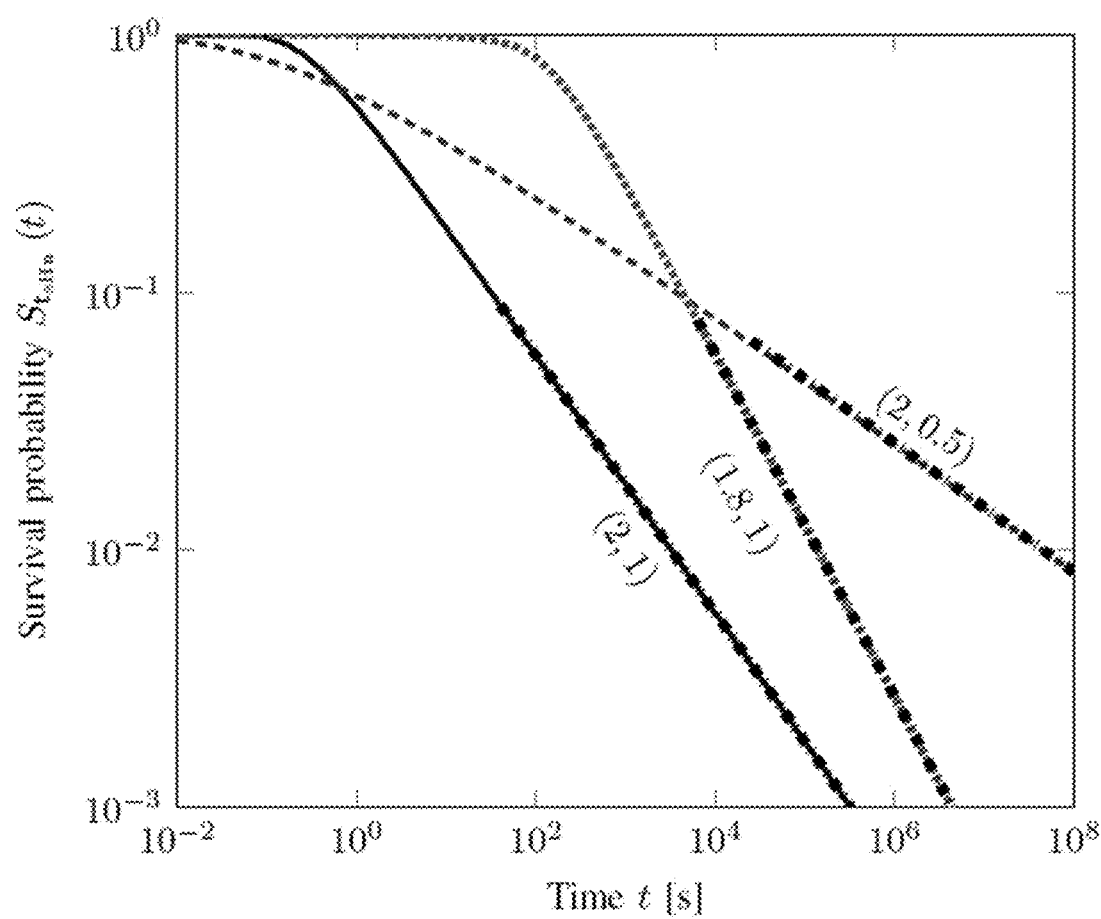
FIG. 9 shows the survival probability of standard H-noise of H-diffusion for the three scenarios according to an embodiment of the present invention.
Figure 10:
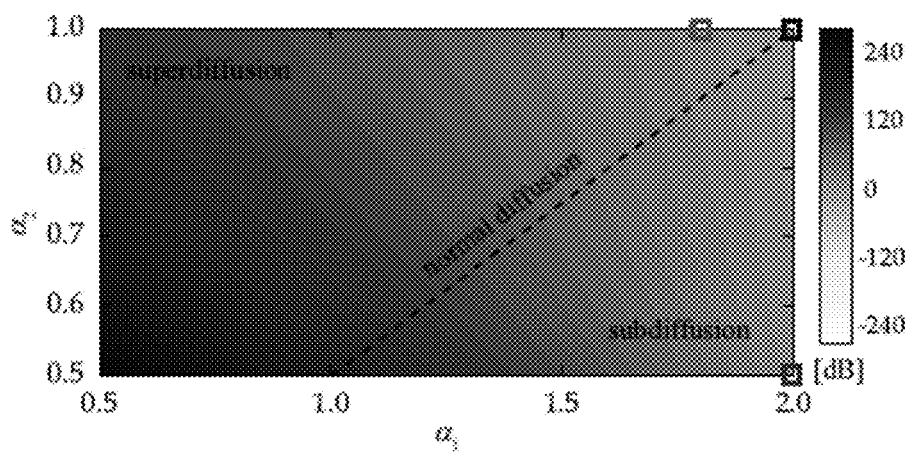
FIG. 10 shows H-noise power of standard H-noise as a function of $(\alpha_1, \alpha_2)$ in different distances "a" according to an embodiment of the present invention.
Figure 10:
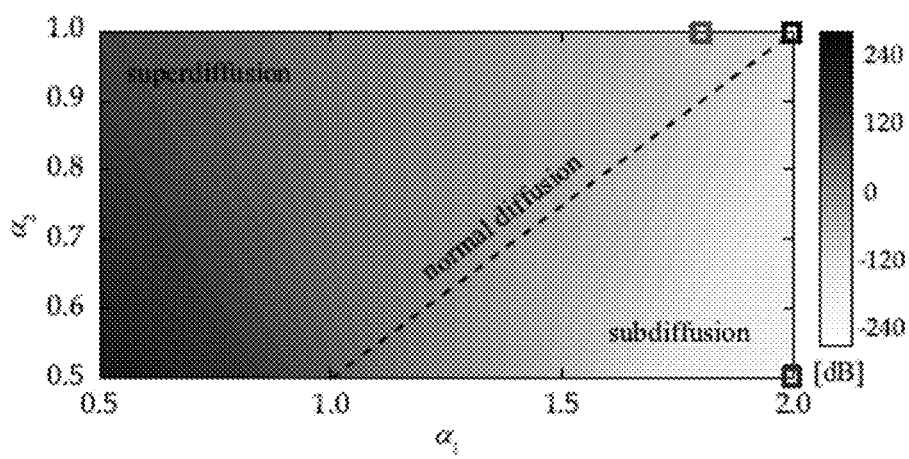
Figure 10:
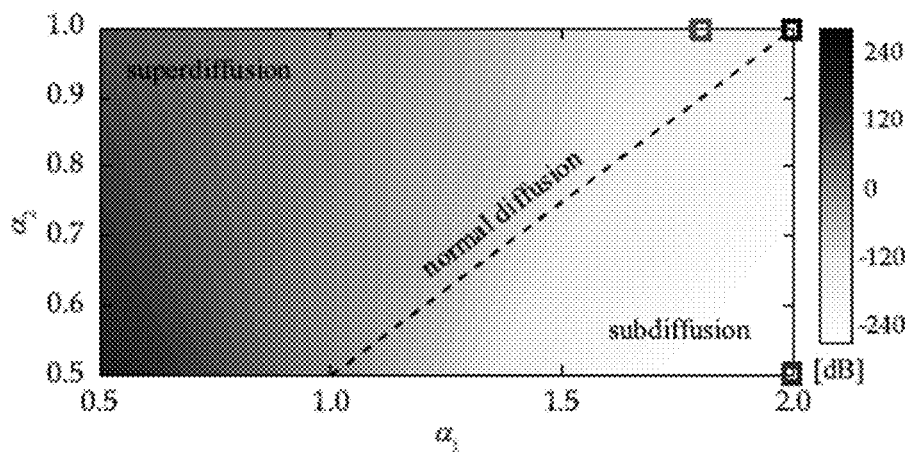

FIG. 8 shows the CDF of standard H-noise in H-diffusion in a $=10^{-5}$ m for three scenarios according to an embodiment of the present invention. In this case, anomalous diffusion for $(\alpha_1, \alpha_2)=(2, 0.5)$ and $(1.8, 1)$ has great diffusion in propagation compared to normal diffusion for $(\alpha_1, \alpha_2)=(2, 1)$. FIG. 9 shows the survival probability of standard H-noise of H-diffusion for the three scenarios according to an embodiment of the present invention. Evidently, an H-noise distribution complies with an asymptotic tail constant scaling behavior, such as that discussed in Theorem 3. FIG. 10 shows H-noise power of standard H-noise as a function of $(\alpha_1, \alpha_2)$ in different distances "a" according to an embodiment of the present invention. It may be seen that H-noise power is increased according to a distant distance "a" and a smaller value of $\alpha_1$ in a fixed diffusion coefficient. From FIG. 8, it may be seen that error performance in low diffusion is better compared to a different type of diffusion in a low SNR region.

IV. ERROR PROBABILITY

In this case, an effect of H-diffusion for error performance of molecular communication is reviewed. In particular, in order to improve reliability for molecular communication, M-array transmission for improving a data transfer rate in addition to N-molecular transmission is taken into consideration.

A. Molecular Communication System Model

Figure 11:
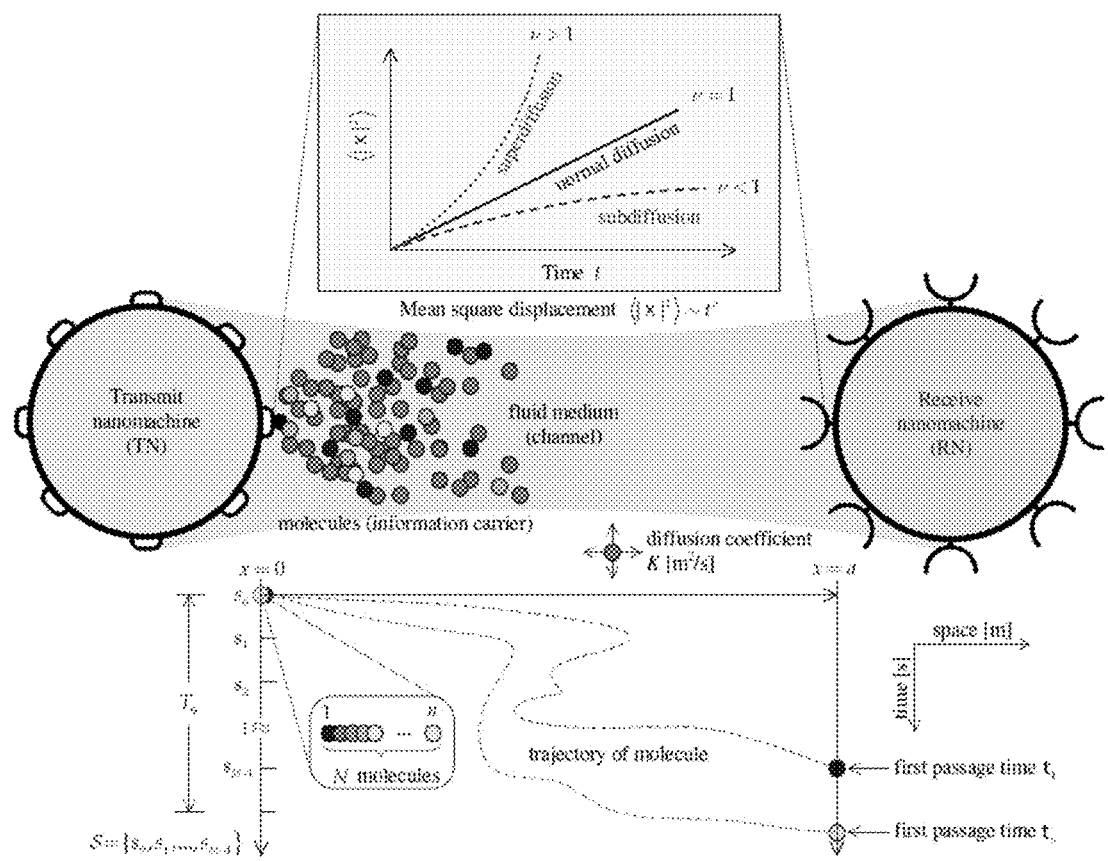
FIG. 11 shows a nanocommunication system including a transmit nanomachine and a receive nanomachine according to an embodiment of the present invention.

FIG. 11 shows a nanocommunication system including a transmit nanomachine and a receive nanomachine according to an embodiment of the present invention. A transmit nanomachine (TN) releases information molecules for receiving a nanomachine in a fluid medium. In this case, a motion of the information molecules is determined by the relation between a mean square displacement and time. In this patent, an anomalous molecular communication system having the following assumptions is considered to be used: 1) the TN may fully control the number and release time of molecules for each symbol message; 2) the clock of the TN is fully synchronized with that of the RN; 3) movements of the molecules within a fluid medium are independent and identically distributed; 4) the RN operates as a full absorption boundary and perfectly measures the arrival time of the molecules; 5) the molecules that reach the RN are absorbed and removed from the system; 6) the RN may wait without a time limit; and 7) time between symbols is sufficiently great in order to avoid inter-symbol interference.

Information is encoded based on the release time. With respect to the n-th molecule of N released molecules in a release time "s", an arrival time "yn" in the RN is given as in Equation 69. In this case, "$t_{Hn}$" and "n" are H-noise of the n-th molecule.

$$y_n = s + t_{Hn,n} \qquad (69)$$

The RN needs to wait until all of molecules are absorbed due to a plurality of released molecules. Accordingly, in order to decode a transmitted symbol, first arrival detection using the first arrival time of a molecule in the RN from among the N released molecules may be taken into consideration. Thereafter, an explicit signal model for single-symbol transmission is given as in Equation 69.

$$y = s + t_{min} \tag{70}$$

In Equation 70, $t_{min} = \min\{tHn, 1, tHn, 2, \ldots, t_{Hn}, N\}$ indicates the first arrival H-noise.

B. Error Probability Analysis

Information may be decoded using maximum likelihood detection of Equation 71 as below with respect to M-array modulation. In this case, a conditional probability is given as in Equation 72.

$$\hat{s} = \arg\max_{s=\{s_0, s_1, \ldots, s_{M-1}\}} p_{y|s}(y|s) \tag{71}$$

Proposition 2 (density function of first arrival H-noise): in the case of H-noise in which $t_{Hn}, 1, t_{Hn}, 2, \ldots, t_{Hn}, N$ are i.i.d., the density function of the first arrival H-noise is given as in Equation 72.

$$p_{y|s}(y|s) = \begin{cases} p_{t_{min}}(y-s), & y > s, \\ 0, & y \leq s. \end{cases} \tag{72}$$

Proof: An accumulated density function is given as in Equation 73 and satisfies relations, such as Equations 74 and 75.

$$p_{t_{min}}(t) = NH^{n_1+n_2,m_1+m_2}_{q_1+q_2,p_1+p_2}\left(t; \mathcal{P}_{Hn} \mid \cdot (ac_{gf})^{1/(\omega_1\omega_2)}\right) \times \tag{73}$$
$$\left[H^{n_1+n_2+1,m_1+m_2}_{q_1+q_2+1,p_1+p_2+1}\left(\frac{t}{(ac_{gf})^{1/(\omega_1\omega_2)}}; \mathcal{P}^{-1}_{cdf}\langle 1 \mid \mathcal{P}_{Hn}\rangle\right)\right]^{N-1}$$

$$F_{t_{min}}(t) = \mathbb{P}\{\min\{t_{Hn,1}, \ldots, t_{Hn,N}\} < t\} \tag{74}$$
$$= 1 - \prod_{i=1}^{N} \mathbb{P}\{t_{Hn,i} > t\}$$
$$= 1 - \prod_{i=1}^{N} (1 - F_{t_{Hn,i}}(t))$$
$$= 1 - (1 - F_{t_{Hn}}(t))^N.$$

$$p_{t_{min}}(t) = dF_{t_{min}}(t)/dt \tag{75}$$
$$= Np_{t_{Hn}}(t)(1 - F_{t_{Hn}}(t))^{N-1}$$

Theorem 5 (upper bound of SEP): a symbol error probability (SEP) for M-array and N-molecular transmission has an upper bound, such as Equation 76. In this case, a parameter sequence is expressed as in Equation 77.

$$P_e \leq \frac{M-1}{M}\left[H^{n_1+n_2+1,m_1+m_2}_{q_1+q_2+1,p_1+p_2+1}\left(\frac{T_s/M}{(ac_{gf})^{1/(\omega_1\omega_2)}}; \mathcal{P}_{e,Hn}\right)\right]^N \tag{76}$$

$$\mathcal{P}_{e,Hn} = \mathcal{P}^{-1}_{cdf}\langle 1 \mid \mathcal{P}_{Hn}\rangle \tag{77}$$

Table 3 shows upper bounds for the SEP for the typical anomalous diffusion of Table 1.

TABLE 3

$$P_e \leq \frac{M-1}{M}\left[H^{m,n}_{p,q}\left(\frac{T_s/M}{\alpha^{1/\omega}}; \mathcal{P}\right)\right]^N$$

| Diffusion | | Upper bound on the SEP $P_e$ | |
|---|---|---|---|
| h(t) | O | $\mathcal{P}$ | $\omega$ |
| ST-FD | (2, 2, 4, 4) | $\left(\frac{2}{\alpha_{st}}, 1, (0_3, 1), 0_4, \left(\frac{1}{\beta_{st}}, \frac{\alpha_{st}}{\beta_{st}}, \frac{\alpha_{st}}{2\beta_{st}}, 1\right), \left(1, \frac{1}{\beta_{st}}, \frac{\alpha_{st}}{2\beta_{st}}, 1\right)\right)$ | $\beta_{st}/\alpha_{st}$ |
| S-FD | (2, 1, 3, 3) | $\left(\frac{2}{\alpha_{st}}, 1, (0_2, 1), 0_3, \left(\alpha_{st}, \frac{\alpha_{st}}{2}, 1\right), \left(1_2, \frac{\alpha_{st}}{2}\right)\right)$ | $1/\alpha_{st}$ |
| T-FD | (1, 1, 2, 2) | $\left(1, 1, (0, 1), 0_2, \left(\frac{2}{\beta_{st}}, 1\right), 1_2\right)$ | $\beta_{st}/2$ |
| EK-FD | (1, 2, 3, 2) | $\left(\frac{1}{\sqrt{\pi}}, 2^{2/\alpha_{ek}}, \left(0, \frac{1}{2}, 1\right), 0_2, \left(\frac{1}{\alpha_{ek}}1_2, 1\right), \left(1, \frac{\beta_{ek}}{\alpha_{ek}}\right)\right)$ | $\alpha_{ek}/2$ |
| GBM | (1, 2, 3, 2) | $\left(\frac{1}{\sqrt{\pi}}, 2^{2/\alpha_{ek}}, \left(0, \frac{1}{2}, 1\right), 0_2, \left(\frac{1}{\alpha_{ek}}1_2, 1\right), 1_2\right)$ | $\alpha_{ek}/2$ |
| FBM | (1, 1, 2, 1) | $\left(\frac{1}{\sqrt{\pi}}, 2^{2/\alpha_{ek}}, \left(\frac{1}{2}, 1\right), 0, \left(\frac{1}{\alpha_{ek}}, 1\right), 1\right)$ | $\alpha_{ek}/2$ |
| BM | (1, 1, 2, 1) | $\left(\frac{1}{\sqrt{\pi}}, 4, \left(\frac{1}{2}, 1\right), 0, 1_2, 1\right)$ | $1/2$ |

Proof: in relation to the same-likelihood symbol, the error probability has a relation, such as Equation 78.

$$P_e = \frac{1}{M} \sum_{i=0}^{M-1} \mathbb{P}\{\hat{s} \neq s_i \mid s = s_i\} \qquad (78)$$

$$\leq \frac{1}{M} \sum_{i=0}^{M-2} \mathbb{P}\left\{y > (i+1)\frac{T_s}{M} \mid s = i\frac{T_s}{M}\right\}$$

$$= \frac{M-1}{M}\left(1 - F_{t_{min}}\left(\frac{T_s}{M}\right)\right).$$

In this case, a CDF may be expressed as in Equation 79.

$$F_{t_{min}}(t) = 1 - \left[H_{q_1+q_2+1, p_1+p_2+1}^{n_1+n_2+1, m_1+m_2}\left(\frac{t}{(ac_{gf})^{1/(\omega_1\omega_2)}}; \mathcal{P}_{cdf}^{-1}(1 \mid \mathcal{P}_{Hn})\right)\right]^N \qquad (79)$$

Definition (signal-to-noise ratio): the SNR for a molecular communication link may be defined by a normalized form, such as Equation 80.

$$snr \triangleq \frac{1}{2\mathcal{G}}\left(\frac{T_s}{\mathcal{P}(t)}\right)^2 \qquad (80)$$

1) Standard H-diffusion: in relation to standard H-diffusion, an SEP may be expressed as in Equation 81, and a parameter sequence is expressed as in Equation 82.

$$P_s \leq \frac{M-1}{M}\left[H_{4,4}^{2,2}\left(\frac{M^2}{2\mathcal{G}^*snr}; \mathcal{P}_{e,sHn}\right)\right]^N \qquad (81)$$

$$\mathcal{P}_{e,sHn} = \left(\frac{4}{\alpha_1}, 1, 1_4, (1_3, 0),\right. \qquad (82)$$

$$\left.\left(2, \frac{2}{\alpha_1\omega_1\omega_2}, \frac{1}{\omega_1\omega_2}, \frac{2\alpha_2}{\omega_2}\right), \left(\frac{2}{\omega_2}, \frac{2}{\omega_1\omega_2}, \frac{1}{\omega_1\omega_2}, 2\right)\right)$$

2) High-SNR expansion: in a high SNR region, the SEP may be expressed as Equation 83.

$$P_e = (p_\infty \cdot snr)^{-s_\infty} + o(snr^{-s_\infty}), \ snr \to \infty \qquad (83)$$

Corollary 4 (high-SNR expansion): in a high SNR region, two physical amounts for standard H-diffusion are given as in Equations 84 and 85. In this case, g(M,N) is the same as Equation 86.

$$s_\infty = N \cdot \min\left\{\frac{\omega_2}{2}, \frac{\omega_1\omega_2}{2}\right\} \qquad (84)$$

$$p_\infty = \left(\frac{1}{g(M,n)}\right)^{1/s_\infty} \qquad (85)$$

$$g(M, N) = \begin{cases} (M-1)M^{N\omega_1\omega_2-1}\left(\dfrac{\Gamma(1-\omega_1)\Gamma(1/\alpha_1)}{\alpha_1 * \Gamma(1-\alpha j\omega_1)} \dfrac{(\mathcal{G}^*)^{-\omega_1\omega_2/2}}{2^{\omega_1\omega_2/2-1}}\right)^N & \omega_1 < 1, \\ (M-1)M^{N\omega_2-1}\left(\dfrac{\sin(\pi/(2\omega_1))\Gamma(1-1/\omega_1)\Gamma(1/(\alpha_1\omega_1))}{\alpha_1 * \Gamma(1-\alpha_2)} \dfrac{(\mathcal{G}^*)^{-\omega_2/2}}{2^{\omega_2/2-1}}\right)^N, & \omega_1 > 1. \end{cases} \qquad (86)$$

Proof: Equation 87 may be obtained using arithmetic approximate expansion of an H-function, and relations of Equations 88 and 89 are established.

$$H_{4,4}^{2,2}\left(\frac{M^2}{2\mathcal{G}^*snr}; \mathcal{P}_{e,sHn}\right) = \qquad (87)$$

$$\frac{4}{\alpha_1}\sigma^*(\mathcal{P}_{e,sHn})\left(\frac{M^2}{2\mathcal{G}^*snr}\right)^{\omega'(\mathcal{P}_{e,sHn})} + o\left(snr^{-\omega^1(\mathcal{P}_{e,sHn})}\right), \ snr \to \infty$$

$$\omega^*(\mathcal{P}_{e,sHn}) = \min\left\{\frac{\omega_1\omega_2}{2}, \frac{\omega_2}{2}\right\} \qquad (88)$$

$$\sigma^*(\mathcal{P}_{e,sHn}) = \begin{cases} \dfrac{\Gamma(1-\omega_1)\Gamma(1/\alpha_1)}{2\pi\Gamma(1-\alpha_2\omega_1)}, & \omega_1 < 1 \\ \dfrac{\sin(\pi/(2\omega_1))\Gamma(1-1/\omega_1)\Gamma(1/(\alpha_1\omega_1))}{2\pi\Gamma(1-\alpha_2)}, & \omega_1 > 1 \end{cases} \qquad (89)$$

Table 4 shows high-SNR expansion of an error probability for the typical anomalous diffusion of Table 1.

TABLE 4

| | High-SNR slope | High-SNR power offset |
|---|---|---|
| Diffusion | $s_\infty = N\omega$ | $p_\infty = [M^{1-2s_\infty}/((M-1)p_c^N)]^{1/s_\infty}$ |
| h(t) | $\omega$ | $p_c$ |
| ST-FD | $\min\left\{\dfrac{\beta_{st}}{2}, \dfrac{\beta_{st}}{2\alpha_{st}}\right\}$ | $\begin{cases} \dfrac{\sin(\pi\alpha_{st}/2)\Gamma(1-\alpha_{st})}{\pi\alpha_{st}\Gamma(1-\beta_{st})}\dfrac{\mathcal{G}\beta_{st}/2-\alpha_{st}}{2\beta_{st}/2-1}, & \text{if } \alpha_{st} < 1 \\ \dfrac{\csc(\pi/\alpha_{st})}{\alpha_{st}\Gamma(1-\beta_{st}/\alpha_{st})}\left(\dfrac{\mathcal{G}}{2}\right)^{\beta_{st}/(2\alpha_{st})-1}, & \text{if } \alpha_{st} > 1 \end{cases}$ |

TABLE 4-continued

| Diffusion $h(t)$ | High-SNR slope $s_\infty = N\omega$ $\omega$ | High-SNR power offset $p_\infty = [M^{1-2s_\infty}/((M-1)p_c^N)]^{1/s_\infty}$ $p_c$ |
|---|---|---|
| S-FD | $1/(2\alpha_{st})$ | $\dfrac{\Gamma(1+1/\alpha_{st})}{\pi}\left(\dfrac{\mathcal{G}}{2}\right)^{1/(2\alpha_{st})-1}$, for $\alpha_{st} > 1$ |
| T-FD | $\beta_{st}/4$ | $\dfrac{1}{2\Gamma(1-\beta_{st}/2)}\left(\dfrac{\mathcal{G}}{2}\right)^{\beta_{st}/4-1}$ |
| EK-FD | $\alpha_{ek}/4$ | $\dfrac{1}{\Gamma(1-\beta_{ek}/2)}\dfrac{\mathcal{G}^{\alpha_{ek}/2-1}}{(2\mathcal{G})^{\alpha_{ek}/4}}$ |
| GBM | $\alpha_{ek}/4$ | $\dfrac{1}{\Gamma(1-\alpha_{ek}/2)}$ |
| FBM | $\alpha_{ek}/4$ | $\dfrac{1}{\sqrt{\pi\mathcal{G}}}\dfrac{1}{(2\mathcal{G})^{\alpha_{ek}/4}}$ |
| BM | $1/4$ | $\dfrac{1}{\sqrt{\pi\mathcal{G}}}\dfrac{1}{(2\mathcal{G})^{1/4}}$ |

Remark 15 (high-SNR slope): as described in Corollary 4, a high-SNR slope increases linearly depending on the number of released molecules. Such a result is similar to transmit diversity in a wireless communication system adopting a plurality of antennas. Accordingly, such a characteristic may be said to be an advantage generated as molecule resources are consumed.

C. Numerical Example

Figure 7:
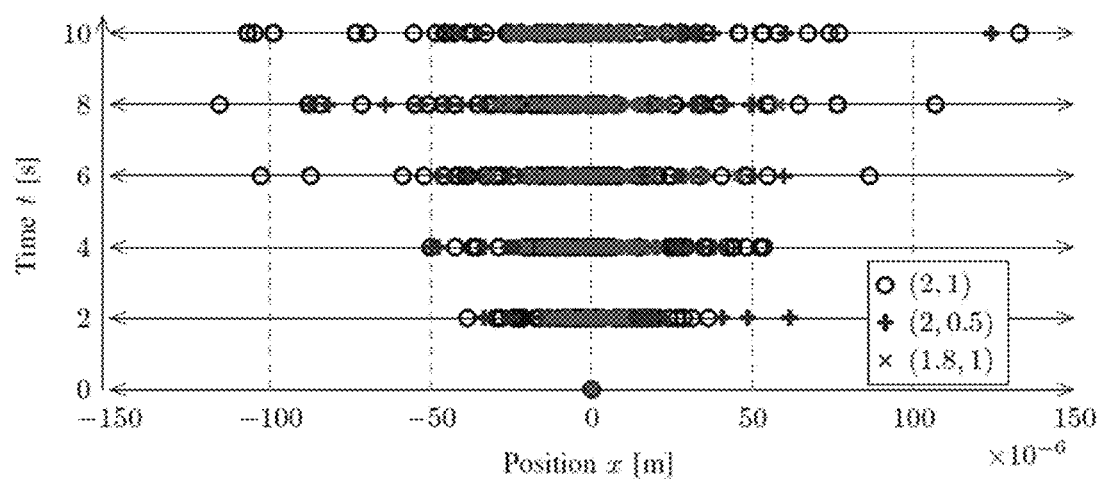
FIG. 7 shows the position of molecules x in standard H-diffusion in time "t" for different $\alpha_1$ and $\alpha_2$ according to an embodiment of the present invention.
Figure 7:
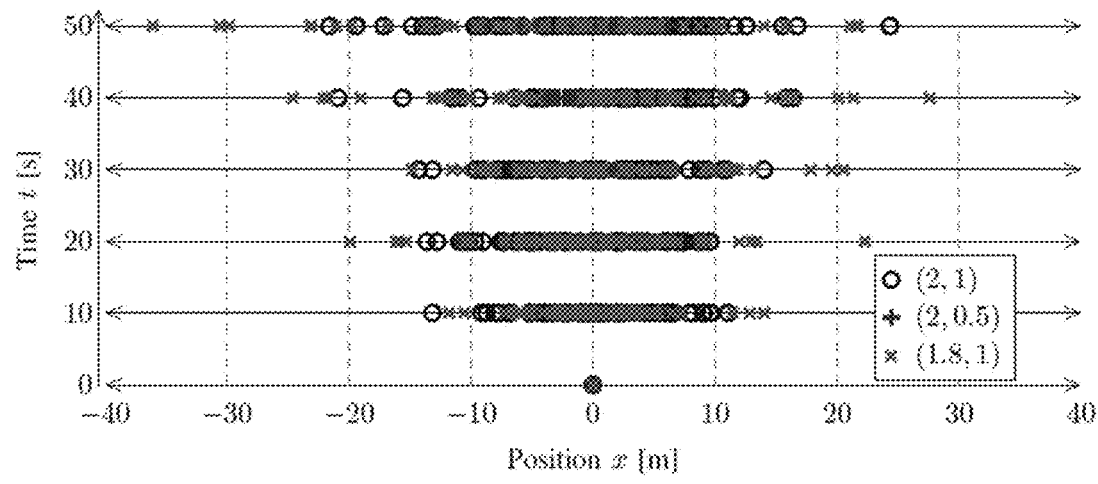
Figure 12:
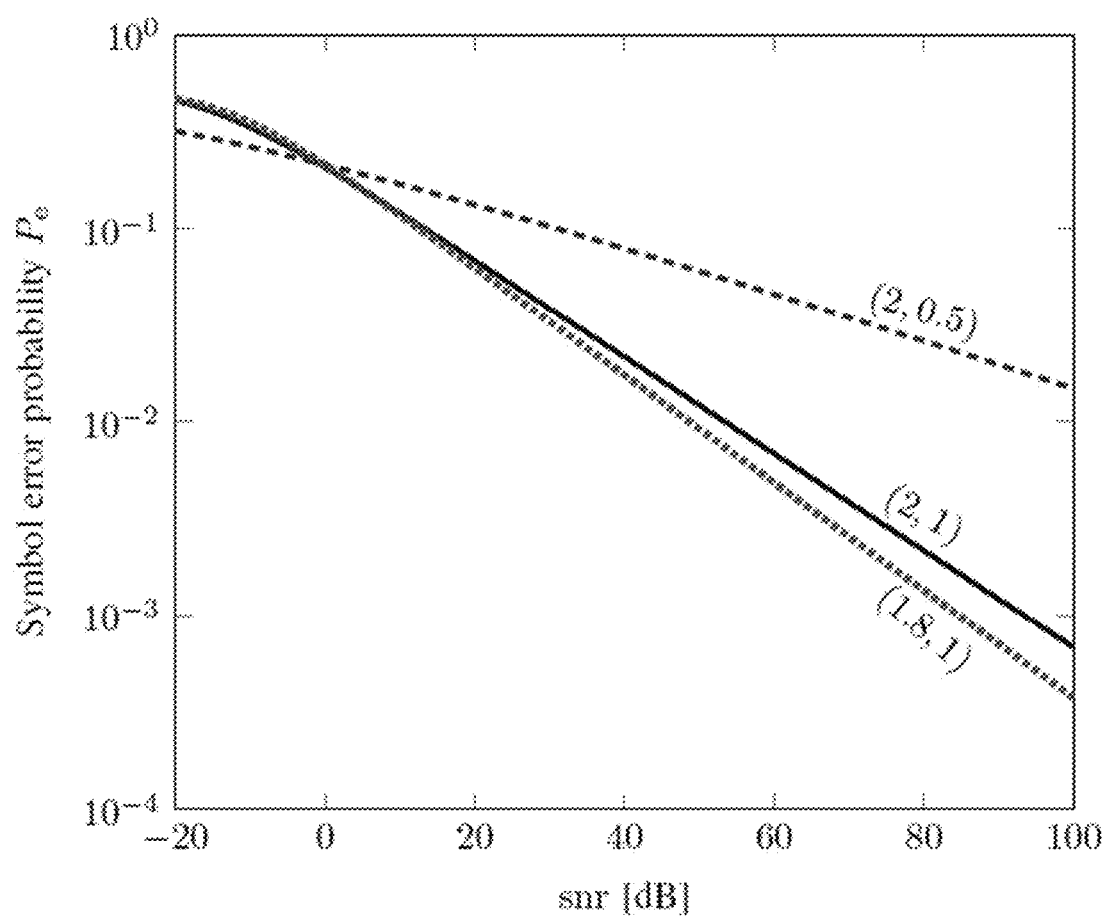
FIG. 12 shows symbol error probabilities (SEPs) as functions of the SNR of standard H-diffusion for the three scenarios in FIG. 7.

FIG. 12 shows symbol error probabilities (SEPs) as functions of the SNR of standard H-diffusion for the three scenarios in FIG. 7. In this case, N=1 means single molecular transmission, and M=2 means binary modulation. As shown in FIG. 12, molecular communication reliability can be improved by a lot of symbol time Ts (low symbol transfer rate).

Figure 13:
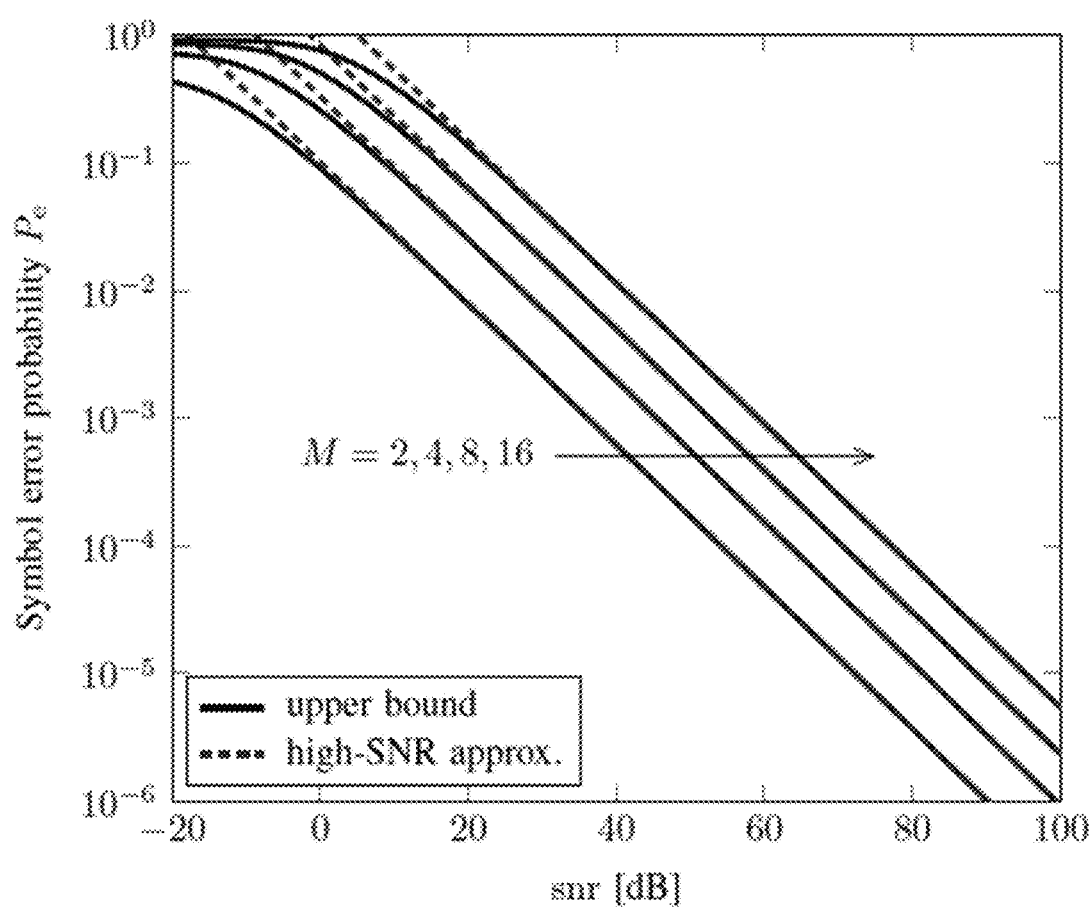
FIG. 13 shows SEPs as functions of SNR in standard H-diffusion for M=2, 4, 8 and 16 in N=2 according to an embodiment of the present invention.
Figure 14:
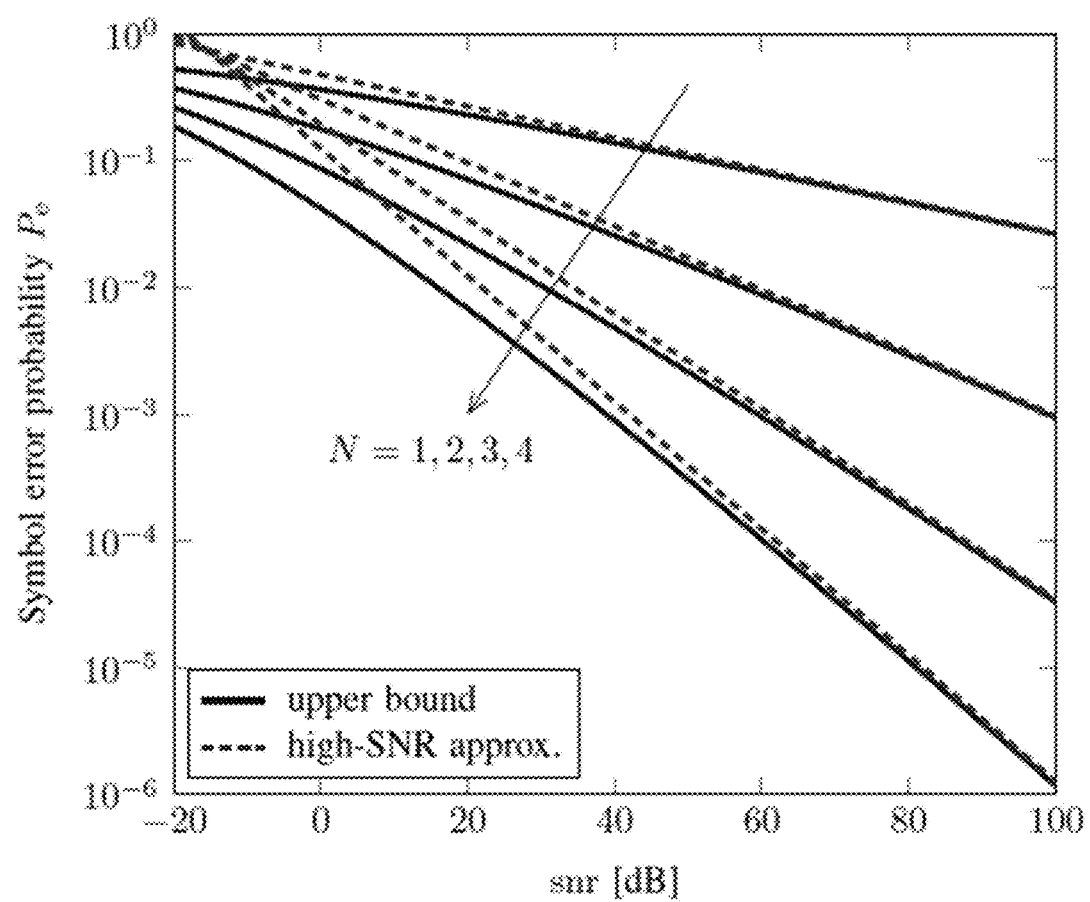
FIG. 14 shows an effect of the number of released molecules in error performance.

FIG. 13 shows SEPs as functions of SNR in standard H-diffusion for M=2, 4, 8 and 16 in N=2 according to an embodiment of the present invention. As shown in FIG. 13, it may be seen that the data transfer rate can be improved by increasing modulation order M while sacrificing reliability of SEP performance. FIG. 14 shows an effect of the number of released molecules in error performance. Referring to FIGS. 13 and 14, high SNR expansion expressions are almost the same in the power offset and slope of an SEP curve.

Figure 15:
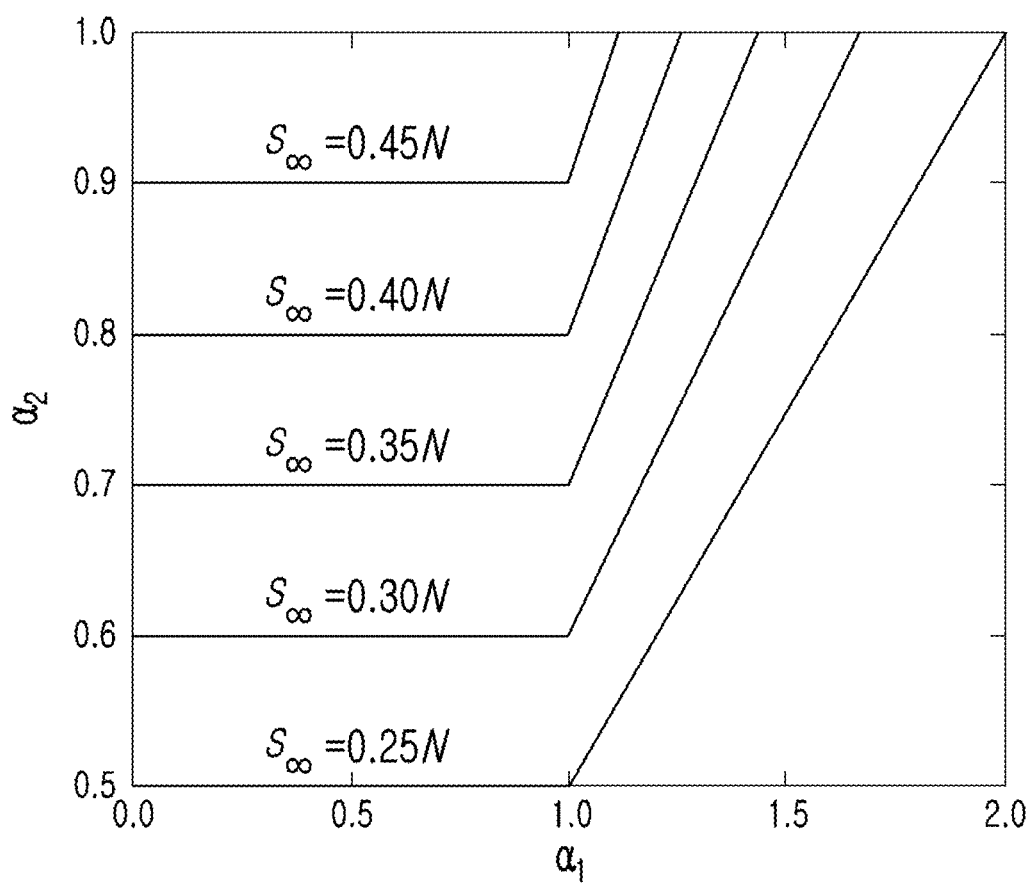
FIG. 15 shows high SNR slopes of SEPs as a function of $(\alpha_1, \alpha_2)$ in standard H-diffusion according to an embodiment of the present invention.

FIG. 15 shows high SNR slopes of SEPs as a function of $(\alpha_1, \alpha_2)$ in standard H-diffusion according to an embodiment of the present invention. As expected, a high SNR slope $s_\infty$ in $(\alpha_1, \alpha_2)$-standard H-diffusion is increases as $\alpha_2$ of the SEP is increased. In contrast, in region where $\alpha_1 > 1$, the high SNR slope $s_\infty$ is decreased as $\alpha_1$ is increases.

Figure 16:
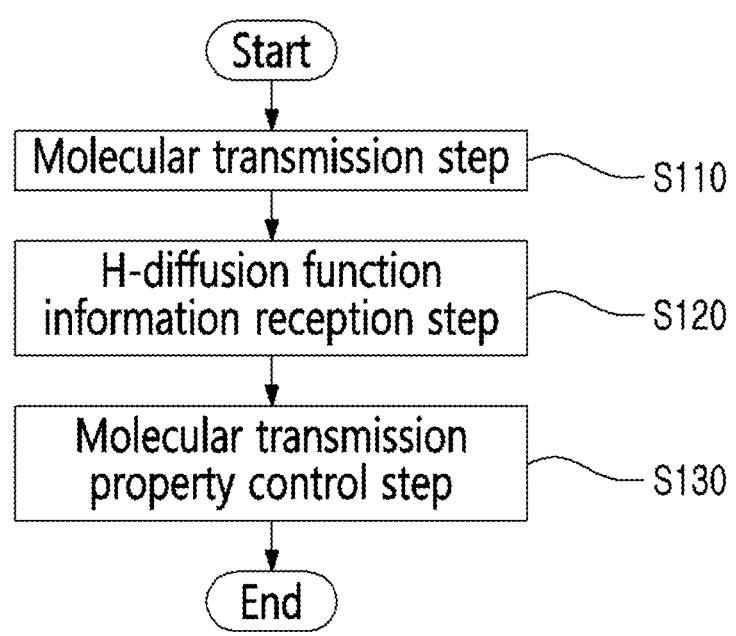
FIG. 16 shows a flowchart of a method of modeling a molecular channel and transmitting molecules, which is performed by a first device, that is, a transmit (nano) machine, according to an embodiment of the present invention.
Figure 17:
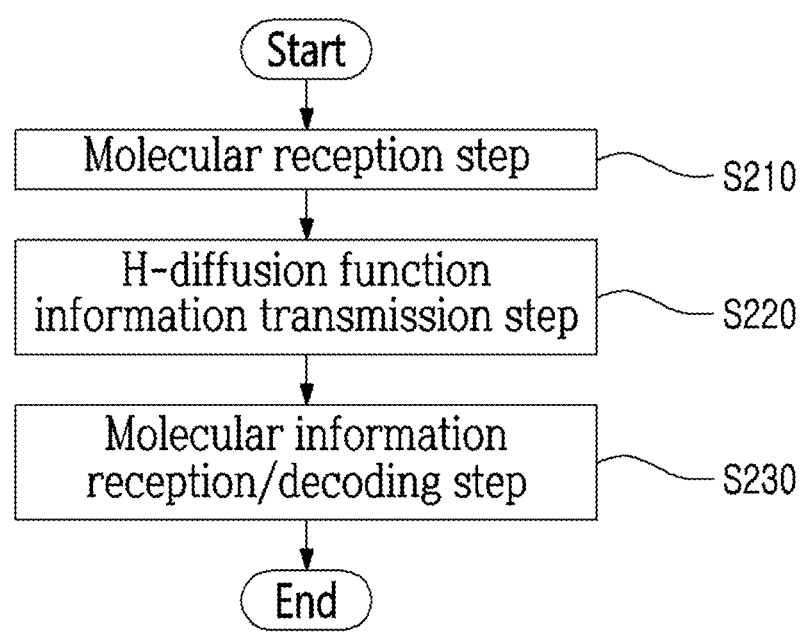
FIG. 17 shows a flowchart of a method of modeling a molecular channel and receiving molecules, which is performed by a second device, that is, a receive (nano)machine, according to an embodiment of the present invention.

A method of modeling a molecular channel and transmitting molecules according to another aspect of the present invention is described based on the aforementioned contents. FIG. 16 shows a flowchart of a method of modeling a molecular channel and transmitting molecules, which is performed by the first device, that is, a transmit (nano) machine, according to an embodiment of the present invention. FIG. 17 shows a flowchart of a method of modeling a molecular channel and receiving molecules, which is performed by the second device, that is, a receive (nano) machine, according to an embodiment of the present invention. The contents described in the transmit nanomachine and the receive nanomachine may be combined with the following methods and used.

Referring to FIG. 16, the method of modeling a molecular channel and transmitting molecules includes a molecular transmission step S110, an H-diffusion function information reception step S120, and a molecular transmission property control step S130.

In the molecular transmission step S110, the first device transmits molecules, that is, an information carrier, through a molecular communication channel. In the H-diffusion function information reception step S120, the first device receives information about an H-diffusion function, that is, a function associated with the diffusion of the channel. In the H-diffusion function information reception step S120, the function is the green function of H-diffusion and determined as below.

$$w(x, t; \omega_1, \omega_2) = \dfrac{|x|^{1/\omega_1-1}}{\omega_1 t^{\omega_2}} \mathbb{H}^{m_2, n_2}_{p_2, q_2}\left\{ H^{n_1, m_1}_{q_1, p_1}\left(\tau; \left(1, \dfrac{1}{\omega_1}, -\omega_1 \mid \mathcal{P}_1^{-1}\right); \mathcal{P}_2\right)\left(\dfrac{|x|^{1/\omega_1}}{t^{\omega_2}}\right) \right\}$$

Furthermore, in the H-diffusion function information reception step S120, the received information may be information about the trajectory of the molecules on the time-space of the channel with respect to N molecules. Furthermore, in the H-diffusion function information reception step S120, the first device may receive information about a diffusion factor υ based on a mean square displacement $<|x|^2>$ according to the time of the molecules. Furthermore, in the H-diffusion function information reception step S120, the first device may receive first information about a molecular diffusion parameter α which is obtained from information about the probability density function (PDF) of z, that is, H-variates associated with the H-diffusion of the molecules. Furthermore, the first device may further receive second information about a Q-Q plot indicative of quantiles according to the molecular diffusion parameter $\alpha$ based on the quantiles of a reference diffusion parameter $\alpha_1$. Referring to FIGS. 3 and 4, a case where $\alpha_1=2$ may correspond to the reference diffusion parameter. In this case, a Gaussian distribution in which the mean is 0 and dispersion is 2 is obtained. A Q-Q plot for different $\alpha_1=1.5$, 1.0, and 0.5 based on $\alpha_1=2$ may be indicated. In this case, first H-variates $z_1(\alpha_1=2, 1.5, 1.0,$ and $0.5)$ comply with standard H-diffusion. Referring to FIGS. 5 and 6, a case where $\alpha_2=0.5$ may correspond to the reference diffusion parameter. A Q-Q plot for different $\alpha_2=0.3$, 0.7, 0.9 based on $\alpha_2=0.5$ may be indicated. In this case, second H-variates $z_2(\alpha_2=\alpha_2=0.3, 0.5, 0.7, 0.9)$ complies with the standard H-diffusion.

Furthermore, in the molecular transmission property control step S130, the first device controls the transmission property that the molecules are transmitted based on the received information about the H-diffusion function. Furthermore, in the molecular transmission property control step S130, the first device may determine the energy amplitude level and modulation order (M-ary) of the molecules based on the first information. Furthermore, the first device may control transmission speed of information, a transport stream number N, and M-ary associated with the molecules based on the information about the trajectory of the molecules or the information about the diffusion factor $\upsilon$. In this case, the transport stream number N may be a total number of available reception means of receive nanomachines or less.

Referring to FIG. 17, a method of modeling a channel and receiving molecules includes a molecular reception step S210, an H-diffusion function information transmission step S220, and a molecular information reception/decoding step 230.

In the molecular reception step S210, the second device receives molecules, that is, an information carrier, through a molecular communication channel. In the H-diffusion function information transmission step S220, the second device transmits information about an H-diffusion function, that is, a function associated with the diffusion of the channel. Furthermore, in the molecular information reception/decoding step 230, the second device receives molecular information whose transmission property that the molecules are transmitted is controlled, and decodes the received molecular information. In this case, the transmission property is controlled by a transmit nanomachine based on the received information about the H-diffusion function.

In the H-diffusion function information transmission step S220, the function is a green function of H-diffusion and may be determined as follows.

$$w(x, t; \omega_1, \omega_2) = \frac{|x|^{1/\omega_1 - 1}}{\omega_1 t^{\omega_2}} \mathbb{H}_{p_2,q_2}^{m_2,n_2}\left\{ H_{q_1,p_1}^{n_1,m_1}\left(\tau; \left(1, \frac{1}{\omega_1}, -\omega_1 \mid \mathcal{P}_1^{-1}\right); \mathcal{P}_2\right) \left| \frac{|x|^{1/\omega_1}}{t^{\omega_2}} \right. \right\}$$

In the H-diffusion function information transmission step S220, the transmitted information may be information about the trajectory of N molecules on the time-space of the channel.

In the H-diffusion function information transmission step S220, the second device may estimate a mean square displacement $<|x|^2>$ according to the time of the molecules, and may transmit information about a diffusion factor $\upsilon$ based on the estimated mean square displacement $<|x|^2>$.

Furthermore, in the H-diffusion function information transmission step S220, the second device may transmit first information about a molecular diffusion parameter $\alpha$ which is obtained from information about the probability density function (PDF) of z, that is, H-variates associated with the H-diffusion of the molecules. Furthermore, the second device may further transmit second information about a Q-Q plot indicative of quantiles according to the molecular diffusion parameter $\alpha$ based on the quantiles of a reference diffusion parameter $\alpha_1$.

In the molecular information reception/decoding step S230, the second device may receive an information carrier transmitted by the first device based on transmission speed of information, determined by the first device and associated with the molecules, based on an energy amplitude level of the molecules determined by the first device based on the first information, and the second information, and may decode the received information carrier. In this case, the transmission speed may be determined based on the information about the trajectory of the molecules or the information about the diffusion factor $\upsilon$. In this case, the speed at which the information carrier is decoded may be determined based on the diffusion factor $\upsilon$ and a method of modulating the information carrier.

The methods of modeling a channel and transmitting/receiving molecules for molecular communication and the transmit (nano)machine and receive (nano)machine performing the same according to embodiments of the present invention have been described above.

A conclusion in the present invention based on the aforementioned contents is as follows.

V. CONCLUSION

An embodiment of the present invention has proposed a new mathematical framework for modeling and analysis in (passive transport) molecular communication. First, a diffusion process of a common class, that is, a method of generating a probability distribution function (PDF) associated with the position of molecules that vary over time, has been described. H-diffusion modeling uses an anomalous diffusion model obtained from two H-variates, and this plays an important role in describing the anomalous evolution of molecules on the time and space. Furthermore, in an embodiment of the present invention, in order to describe a statistical property for uncertainty of random propagation in the H-diffusion rule, H-noise indicative of molecule noise has been introduced and corresponding SNR and error performance have been described.

The method according to an embodiment of the present invention has an advantage in that it can provide a method of modeling a molecular channel using an H-diffusion function in relation to the diffusion of the channel and a method of controlling the same. Furthermore, the method according to an embodiment of the present invention has an advantage in that it can control the property that molecules are transmitted by taking into consideration molecule trajectory information or diffusion information, that is, the transport property of molecules through a channel on the time-space.

What is claimed is:

1. A method of modeling a channel and transmitting molecules for passive transport molecular communication, the method being performed by a first device of a transmission device and comprising:

a molecular transmission step of transmitting molecules which are an information carrier through the channel;

an H-diffusion function information reception step of receiving information about an H-diffusion function which is a function associated with a diffusion of the channel; and a molecular transmission property control step of controlling a transmission property that the molecules are transmitted based on the received information about the H-diffusion function.

2. The method of claim 1, wherein in the H-diffusion function information reception step, the function is a green function of H-diffusion and determined to be:

$$w(x, t; \omega_1, \omega_2) = \frac{|x|^{1/\omega_1 - 1}}{\omega_1 t^{\omega_2}} \mathbb{H}_{p_2, q_2}^{m_2, n_2} \left\{ H_{q_1, p_1}^{n_1, m_1}\left(\tau; \left(1, \frac{1}{\omega_1}, -\omega_1 \,|\, \mathcal{P}_1^{-1}\right); \mathcal{P}_2\right) \left(\frac{|x|^{1/\omega_1}}{t^{\omega_2}}\right) \right\}.$$

3. The method of claim 1, wherein in the H-diffusion function information reception step, the received information comprises information about a trajectory of N molecules on a time-space of the channel.

4. The method of claim 3, wherein the H-diffusion function information reception step comprises receiving:

first information about a molecular diffusion parameter α obtained from information about a probability density function (PDF) of z which is H-variates associated with H-diffusion of the molecules, and second information about a Q-Q plot indicative of quantiles according to the molecular diffusion parameter α based on quantiles for a reference diffusion parameter $\alpha_1$.

5. The method of claim 4, wherein:

the molecular transmission property control step comprises determining an energy amplitude level and modulation order (M-ary) of the molecules based on the first information and controlling transmission speed of information, a transport stream number N, and M-ary associated with the molecules based on the information about the trajectory of the molecules or the information about the diffusion factor υ, and the transport stream number N is a total number of available reception means of receive nanomachines or less.

6. The method of claim 1, wherein the H-diffusion function information reception step comprises receiving information about a diffusion factor υ based on a mean square displacement $<|x|^2>$ according to the time of the molecules.

7. A method of modeling a channel and receiving molecules for passive transport molecular communication, the method being performed by a second device of a reception device and comprising:

a molecular reception step of receiving molecules which are an information carrier through the channel;

an H-diffusion function information transmission step of transmitting information about an H-diffusion function which is a function associated with a diffusion of the channel; and a molecular information reception/decoding step of receiving molecular information whose transmission property that the molecules are transmitted is controlled based on the received information about the H-diffusion function and of decoding the received molecular information.

8. The method of claim 7, wherein in the H-diffusion function information transmission step, the function is a green function of H-diffusion and determined to be:

$$w(x, t; \omega_1, \omega_2) = \frac{|x|^{1/\omega_1 - 1}}{\omega_1 t^{\omega_2}} \mathbb{H}_{p_2, q_2}^{m_2, n_2} \left\{ H_{q_1, p_1}^{n_1, m_1}\left(\tau; \left(1, \frac{1}{\omega_1}, -\omega_1 \,|\, \mathcal{P}_1^{-1}\right); \mathcal{P}_2\right) \left(\frac{|x|^{1/\omega_1}}{t^{\omega_2}}\right) \right\}.$$

9. The method of claim 7, wherein in the H-diffusion function information transmission step, the transmitted information comprises information about a trajectory of N molecules on a time-space of the channel.

10. The method of claim 9, wherein the H-diffusion function information transmission step comprises transmitting:

first information about a molecular diffusion parameter α obtained from information about a probability density function (PDF) of z which is H-variates associated with H-diffusion of the molecules, and second information about a Q-Q plot indicative of quantiles according to the molecular diffusion parameter α based on quantiles for a reference diffusion parameter $\alpha_1$.

11. The method of claim 10, wherein:

the molecular information reception/decoding step comprises receiving the information carrier transmitted by a first device based on an energy amplitude level of the molecules determined by the first device based on the first information and transmission speed of information determined by the first device and associated with the molecules based on the second information, and decoding the received information carrier, the transmission speed is determined based on the information about the trajectory of the molecules or the information about the diffusion factor υ, and a speed at which the information carrier is decoded is determined based on the diffusion factor υ and a method of modulating the information carrier.

12. The method of claim 7, wherein the H-diffusion function information transmission step comprises:

estimating a mean square displacement $<|x|^2>$ according to the time of the molecules, and transmitting information about a diffusion factor υ based on the estimated mean square displacement $<|x|^2>$.

13. A transmit nanomachine performing molecular transmission according to channel modeling for passive transport molecular communication, the transmit nanomachine comprising:

a transceiver configured to transmit molecules which are an information carrier through the channel and to receive information about an H-diffusion function which is a function associated with a diffusion of the channel; and a controller configured to control a transmission property that the molecules are transmitted based on the received information about the H-diffusion function.

14. The transmit nanomachine of claim 13, wherein the information received by the transceiver comprises information about a trajectory of N molecules on a time-space of the channel.

15. The transmit nanomachine of claim 14, wherein the information received by the transceiver comprises:

first information about a molecular diffusion parameter α obtained from information about a probability density function (PDF) of z which is H-variates associated with H-diffusion of the molecules, and second information about a Q-Q plot indicative of quantiles according to the molecular diffusion parameter $\alpha$ based on quantiles for a reference diffusion parameter $\alpha_1$.

16. The transmit nanomachine of claim 15, wherein:

the controller is configured to determine an energy amplitude level and modulation order (M-ary) of the molecules based on the first information and to control transmission speed of information, a transport stream number N, and M-ary associated with the molecules based on the information about the trajectory of the molecules or the information about the diffusion factor $\upsilon$, and the transport stream number N is a total number of available reception means of receive nanomachines or less.

17. The transmit nanomachine of claim 13, wherein the information received by the transceiver comprises information about a diffusion factor $\upsilon$ based on a mean square displacement $<|x|^2>$ according to the time of the molecules.

18. A receive nanomachine performing molecular reception according to channel modeling for passive transport molecular communication, the receive nanomachine comprising:

a transceiver configured to receive molecules which are an information carrier through the channel and to transmit information about an H-diffusion function which is a function associated with a diffusion of the channel; and a controller configured to receive molecular information whose transmission property that the molecules are transmitted is controlled based on the received information about the H-diffusion function and of decoding the received molecular information.

19. The receive nanomachine of claim 18, wherein the information transmitted by the transceiver comprises information about a trajectory of N molecules on a time-space of the channel.

20. The receive nanomachine of claim 19, wherein the transceiver is configured to transmit first information about a molecular diffusion parameter $\alpha$ obtained from information about a probability density function (PDF) of z which is H-variates associated with H-diffusion of the molecules and second information about a Q-Q plot indicative of quantiles according to the molecular diffusion parameter $\alpha$ based on quantiles for a reference diffusion parameter $\alpha_1$.

21. The receive nanomachine of claim 20, wherein:

the controller is configured to receive the information carrier transmitted by a first device based on an energy amplitude level of the molecules determined by the first device based on the first information and transmission speed of information determined by the first device and associated with the molecules based on the second information and to decode the received information carrier, the transmission speed is determined based on the information about the trajectory of the molecules or the information about the diffusion factor $\upsilon$, and a speed at which the information carrier is decoded is determined based on the diffusion factor $\upsilon$ and a method of modulating the information carrier.

22. The receive nanomachine of claim 18, wherein the controller is configured to estimate a mean square displacement $<|x|^2>$ according to the time of the molecules and to transmit information about a diffusion factor $\upsilon$ based on the estimated mean square displacement $<|x|^2>$.

* * * * *